US011788876B2

(12) United States Patent
Yoshikawa

(10) Patent No.: US 11,788,876 B2
(45) Date of Patent: Oct. 17, 2023

(54) BATCH WEIGHING/SUPPLY DEVICE, AND OPERATING METHOD THEREFOR

(71) Applicant: YOSHIKAWA CORPORATION, Satsumasendai (JP)

(72) Inventor: Osamu Yoshikawa, Satsumasendai (JP)

(73) Assignee: YOSHIKAWA CORPORATION, Satsumasendai (JP)

( * ) Notice: Subject to any disclaimer, the term of this patent is extended or adjusted under 35 U.S.C. 154(b) by 574 days.

(21) Appl. No.: 16/976,561

(22) PCT Filed: Apr. 18, 2019

(86) PCT No.: PCT/JP2019/016598
§ 371 (c)(1),
(2) Date: Aug. 28, 2020

(87) PCT Pub. No.: WO2019/220854
PCT Pub. Date: Nov. 21, 2019

(65) Prior Publication Data
US 2021/0364339 A1    Nov. 25, 2021

(30) Foreign Application Priority Data

May 18, 2018  (JP) ................................ 2018-096162

(51) Int. Cl.
*G01G 13/08* (2006.01)
*B65D 88/68* (2006.01)
(Continued)

(52) U.S. Cl.
CPC ............. *G01G 13/08* (2013.01); *B65D 88/68* (2013.01); *B65G 65/4836* (2013.01);
(Continued)

(58) Field of Classification Search
CPC ........ G01G 13/08; G01G 13/24; B65D 88/68; B65G 2201/042; B65G 2811/096; B65G 65/4836
See application file for complete search history.

(56) References Cited

U.S. PATENT DOCUMENTS

| 4,326,645 A * | 4/1982 | Faulkner .............. G01G 13/026 |
| | | 99/348 |
| 9,688,488 B2 | 6/2017 | Yoshikawa et al. |
| 2010/0176159 A1 * | 7/2010 | Yoshikawa ........ B65G 65/4836 |
| | | 222/410 |

FOREIGN PATENT DOCUMENTS

| CA | 929921 A | 7/1973 |
| EP | 0 594 904 A1 | 5/1994 |

(Continued)

OTHER PUBLICATIONS

Intellectual Property India, "Examination Report," issued in Indian Patent Application No. 202037044404, which is an Indian counterpart of U.S. Appl. No. 16/976,561, dated Mar. 10, 2021, 6 pages.

*Primary Examiner* — Natalie Huls

(57) ABSTRACT

In a batch weighing/supply device, a primary height adjustable scraper that reduces the quantity of conveyed raw material when lowered is provided on an upstream side of a discharge port in an annular passage, a secondary height adjustable scraper that further reduces the quantity of conveyed raw material, after the quantity has been reduced by lowering the primary height adjustable scraper, is provided on a downstream side of the primary height adjustable scraper, control means is provided to reduce the rotation speed of rotary blades to a first speed being lower than a normal speed, when the primary height adjustable scraper is lowered and reduce the rotation speed of the rotary blades to a second speed being lower than the first speed, when the secondary height adjustable scraper is lowered, and a sliding (Continued)

gate for opening and closing a raw material drop-down path is provided under the discharge port.

15 Claims, 18 Drawing Sheets

(51) Int. Cl.
*B65G 65/48* (2006.01)
*G01G 13/24* (2006.01)
(52) U.S. Cl.
CPC ....... *G01G 13/24* (2013.01); *B65G 2201/042* (2013.01); *B65G 2811/096* (2013.01)

(56) References Cited

FOREIGN PATENT DOCUMENTS

| | | | |
|---|---|---|---|
| JP | 2013193836 A | * | 9/2013 |
| JP | 2014-024634 A | | 2/2014 |

* cited by examiner

BATCH WEIGHING/SUPPLY DEVICE, AND OPERATING METHOD THEREFOR

This application is a National Stage entry under 35 U.S.C. 371 of International Patent Application No. PCT/JP2019/016598, filed on Apr. 18, 2019, which claims priority from Japanese Patent Application No. 2018-096162, filed May 18, 2018, the entire contents of each of which are incorporated by reference herein.

TECHNICAL FIELD

This invention relates to a supply device for supplying a granular material or the like, the device including a height adjustable scraper, and to a batch weighing/supply device capable of performing batch weighing with a high degree of precision and an operating method therefor.

BACKGROUND ART

In a conventional fixed-quantity granular material supply device, an inner tube for supplying the granular material is provided above a bottom plate with a gap therebetween, a lower end of an outer tube having the same center line as the inner tube is connected to the bottom plate such that an annular passage is formed between the inner and outer tubes, the granular material is caused to flow out into the annular passage through the gap at a fixed angle of repose, a discharge port is provided in the annular passage, central rotary blades (spokes) are provided on an upright rotating body projecting from a central portion of the bottom plate, an outer peripheral rotating ring is provided on the tip ends of the central rotary blades so as to extend around an inner peripheral surface of the outer tube, a plurality of inward claws are provided on the rotating ring, and the granular material that flows out into the annular passage is transported through the annular passage by the spokes and the inward claws so that a fixed quantity of the granular material is discharged through the discharge port (PTL 1, for example).

Further, a granular material supply device in which a height adjustable scraper is provided directly in front of a discharge port and high-precision batch weighing is realized by lowering the scraper and reducing the rotation speed of the central rotary blades at a point where a weighed value acquired during the batch weighing reaches a proximate value has been proposed as this type of granular material supply device (PTL 2).

CITATION LIST

Patent Literature

[PTL 1] Japanese Examined Utility Model Application Publication No. H07-47382
[PTL 2] Japanese Patent Application Publication No. 2013-193836

SUMMARY OF INVENTION

Technical Problem

Incidentally, the device of PTL 2 is an improved version of the device of PTL 1, in which the precision of batch weighing is improved by providing the height adjustable scraper in a single location directly in front of the discharge port, and lowering the height adjustable scraper and reducing the rotation speed of the central rotary blade when approaching the weighed value. Thus, a fixed degree of weighing precision can be achieved during the batch weighing.

With the device of PTL 2, however, when the single scraper is lowered directly in front of the discharge port, the granular material, which is held back in its entirety directly in front of the discharge port, spills into the discharge port from gaps on both sides of the scraper, and this spilled granular material may adversely affect the weighing precision.

Moreover, in recent years, there is demand for further improvements in the precision of batch weighing when supplying a fixed quantity of a granular material serving as a raw material during a process for transporting the granular material, but with the conventional device configurations described above, there is a limit to the degree to which the precision can be improved.

An object of this invention is to provide a batch weighing/supply device and an operating method therefor, with which a dramatic improvement in the precision of batch weighing can be achieved in comparison with the conventional devices described above by providing height adjustable scrapers in two stages and so on, in contrast to the conventional devices.

Solution to Problem (1) To achieve the object described above, firstly, a batch weighing/supply device in which an inner tube is provided above a circular bottom plate on a shared central axis and with a predetermined gap therebetween, an outer tube is provided on the circular bottom plate concentrically with the inner tube such that an annular passage is formed between the inner and outer tubes, a raw material in the inner tube is paid out to the annular passage side from a lower end of the inner tube at a predetermined angle of repose, a plurality of rotary blades are provided so as to rotate on the circular bottom plate about the central axis, a discharge port for the raw material conveyed through the annular passage by the rotary blades is provided in the annular passage, and weighing means is provided to weigh the raw material discharged through the discharge port is configured such that in the annular passage, a primary height adjustable scraper that reduces the quantity of conveyed raw material when lowered is provided on an upstream side of the discharge port, and a secondary height adjustable scraper that further reduces the quantity of conveyed raw material, after the quantity has been reduced by lowering the primary height adjustable scraper, is provided on a downstream side of the primary height adjustable scraper and directly adjacent to the discharge port on the upstream side thereof, respective side edges of both the primary and the secondary height adjustable scrapers are provided in positions a fixed distance away from respective side faces of the annular passage, an upstream-side edge portion of the discharge port is formed as an inclined side edge that intersects the rotary blades, the secondary height adjustable scraper being provided to extend along the inclined side edge, control means is provided to reduce the rotation speed of the rotary blades to a first speed, which is lower than a normal rotation speed, when the primary height adjustable scraper is lowered and reduce the rotation speed of the rotary blades to a second speed, which is lower than the first speed, when the secondary height adjustable scraper is lowered, and a sliding gate capable of opening and closing a raw material drop-down path is provided in a chute unit provided under the discharge port.

The rotary blades can be constituted by spoke-shaped central rotary blades (8) and inward blades (10), for example. The weighing means can be constituted by a load cell (12), adding means (38), granular material weight calculating means (37*q*), and so on, for example. The raw material is a granular material or the like, for example. The control means can be constituted by a control unit (37), for example. The chute unit can be constituted by a chute (25), an extension chute (29), and so on. According to this configuration, a set value of batch weighing, a primary set value that is close to the set value, and a secondary set value that is even closer to the set value, for example, are set, and by lowering the primary height adjustable scraper and reducing the rotation speed of the rotary blades to the first speed when the weighed value reaches the primary set value, and lowering the secondary height adjustable scraper and further reducing the rotation speed of the rotary blades to the second speed when the weighed value reaches the secondary set value, the quantity of raw material discharged in order to be weighed and the discharge speed thereof can be reduced in two stages, thereby suppressing an adverse effect on the weighing precision caused by spillage into the discharge port from the respective sides of the scrapers. As a result, extremely accurate batch weighing can be realized.

(2) Secondly, the batch weighing/supply device described above in (1) is configured such that, using an upstream-side opening start point of the discharge port as a reference, the inclined side edge of the discharge port is formed by inclining an inner peripheral-side corner portion in a counterclockwise direction toward the downstream side by a predetermined angle relative to a radius line of the circular bottom plate that passes through the opening start point, and the primary height adjustable scraper is provided in an orthogonal direction to a direction in which the raw material passes through the annular passage.

According to this configuration, the inclined side edge of the discharge port intersects the rotary blade in an inclined state, and therefore the quantity of raw material dropping down through the discharge port can be reduced (for example, the instantaneous discharge quantity can be reduced to approximately ⅕ as a ratio to convention) in comparison with a conventional discharge port having side edges that are substantially parallel to the rotary blades. As a result, weighing can be performed more accurately. Further, the secondary height adjustable scraper is provided to extend along the inclined side edge directly adjacent to the inclined side edge, and therefore a pulsating flow can be prevented from forming in the granular material or other raw material, with the result that the raw material dropping down through the discharge port from the inclined side edge can be reduced evenly.

(3) Thirdly, the batch weighing/supply device described above in (1) or (2) is configured such that storage means is provided to store a set value of batch weighing, a primary set value, and a secondary set value, control means is provided for the primary and secondary height adjustable scrapers, the rotary blades, and the sliding gate, and the control means is configured to perform a primary reduction operation, in which the primary height adjustable scraper is lowered and the rotation speed of the rotary blades is reduced, when a weighed value reaches the primary set value during a normal weighing operation, to perform a secondary reduction operation, in which the secondary height adjustable scraper is lowered and the rotation speed of the rotary blades is reduced below that of the primary reduction operation, when the weighed value reaches the secondary set value, and to stop the rotary blades from rotating when the weighed value reaches the set value.

According to this configuration, by performing the primary reduction operation, in which the primary height adjustable scraper is lowered and the rotation speed of the rotary blades is reduced, when the weighed value reaches the primary set value and performing the secondary reduction operation, in which the secondary height adjustable scraper is lowered and the rotation speed of the rotary blades is further reduced, when the weighed value reaches the secondary set value, the quantity of raw material discharged in order to be weighed and the discharge speed thereof can be reduced in two stages, with the result that extremely accurate batch weighing can be realized.

(4) Fourthly, the batch weighing/supply device described above in any of (1) to (3) is configured such that the weighing means includes a load cell for weighing the overall weight of the batch weighing/supply device, and the weight of the raw material discharged through the discharge port is calculated on the basis of the overall weight of the device, acquired from the load cell.

(5) Fifthly, the batch weighing/supply device described above in any of (1) to (3) is configured such that the weighing means includes a weighing machine disposed under the discharge port, and the weight of the raw material discharged through the discharge port is recognized on the basis of a weighed value acquired from the weighing machine.

With both the quantity-reduction batch weighing operation described in (4) and the after-weighing operation described in invention (5), batch weighing can be performed with an extremely high degree of precision.

(6) Sixthly, the batch weighing/supply device described above in (4) is configured such that the sliding gate is provided in a position close to the circular bottom plate within the chute unit.

Thus, weighing can be performed extremely accurately with the quantity-reduction batch weighing method.

(7) Seventhly, the batch weighing/supply device described above in (5) is configured such that the sliding gate is provided in a position close to the weighing machine under the chute unit.

Thus, a batch weighing operation can be performed with an extremely high degree of precision likewise with the after-weighing method.

(8) Eighthly, the batch weighing/supply device described above in any of (1) to (7) is configured such that when an inter-rotary blade distance between the rotary blades is set as a and a circumferential direction length of the inclined side edge of the discharge port is set as a', a relationship of a'≥a is established.

According to this configuration, at the end of the batch weighing operation, a rotary blade is always stopped in the position of the inclined side edge of the discharge port, and therefore the weighing performed during the batch weighing operation can be completed in a state where a rotary blade is within the range of the inclined side edge of the discharge port. As a result, an extremely accurate weighing operation can be realized.

(9) Ninthly, an operating method for a batch weighing/supply device, in which an inner tube is provided above a circular bottom plate on a shared central axis and with a predetermined gap therebetween, an outer tube is provided on the circular bottom plate concentrically with the inner tube such that an annular passage is formed between the inner and outer tubes, a raw material in the inner tube is paid out to the annular passage side from a lower end of the inner tube at a predetermined angle of repose, a plurality of rotary blades are provided so as to rotate on the circular bottom plate about the central axis, a discharge port for the raw material conveyed through the annular passage by the rotary blades is provided in the annular passage, and weighing means is provided to weigh the raw material discharged through the discharge port, is configured such that a primary height adjustable scraper provided on an upstream side of the discharge port in order to reduce the quantity of conveyed raw material when lowered, a secondary height adjustable scraper provided on a downstream side of the primary height adjustable scraper and directly adjacent to the discharge port on the upstream side thereof in order to further reduce the quantity of conveyed raw material after the quantity has been reduced by lowering the primary height adjustable scraper, a sliding gate for stopping the raw material from dropping down through the discharge port, control means for drive-controlling the rotary blades, the primary and secondary height adjustable scrapers, and the sliding gate on the basis of a weighed value from the weighing means, and storage means for storing a set value of batch weighing, a primary set value, and a secondary set value are provided in the annular passage, an upstream-side edge portion of the discharge port is formed as an inclined side edge that intersects the rotary blades, and the control means executes the steps of: performing a normal weighing operation for causing the raw material to drop down so as to be supplied through the discharge port, in which the primary height adjustable scraper and the secondary height adjustable scraper are both in raised positions and the raw material is supplied by driving the rotary blades to rotate, until the weighed value reaches the primary set value; performing a primary reduction operation, in which the quantity of conveyed raw material is reduced by lowering the primary height adjustable scraper and the rotation speed of the rotary blades is reduced, from a point at which the weighed value reaches the primary set value; performing a secondary reduction operation, in which the quantity of conveyed raw material is further reduced by lowering the secondary height adjustable scraper and the rotation speed of the rotary blades is further reduced, from a point at which the weighed value reaches the secondary set value; and stopping the rotary blades from rotating and stopping the raw material from dropping down through the discharge port by closing the sliding gate from a point at which the weighed value reaches the set value.

Advantageous Effects of Invention

According to this invention, the quantity of raw material discharged in order to be weighed and the speed of the rotary blades can be reduced in two stages, thereby suppressing spillage of the granular material, and as a result, extremely accurate batch weighing can be realized.

Further, the inclined side edge of the discharge port intersects the rotary blades in an inclined state, and therefore the quantity of raw material dropping down through the discharge port can be reduced (to approximately ⅕ as a ratio to convention, for example), with the result that weighing can be performed more accurately.

Furthermore, a pulsating flow can be prevented from forming in the raw material discharged through the discharge port, and as a result, the raw material dropping down through the discharge port from the inclined side edge can be reduced evenly.

Moreover, batch weighing can be performed with an extremely high degree of precision using both the quantity-reduction batch weighing method and the after-weighing method as the weighing method, i.e. irrespective of the weighing method.

Furthermore, at the end of the batch weighing operation, a rotary blade is always stopped in the position of the inclined side edge of the discharge port, and therefore the weighing performed during the batch weighing operation can be completed in a state where a rotary blade is within the position range of the inclined side edge of the discharge port. As a result, an extremely accurate weighing operation can be realized.

DESCRIPTION OF EMBODIMENTS

Embodiments of a batch weighing/supply device according to this invention will be described in detail below with reference to the attached figures.

Figure 1:
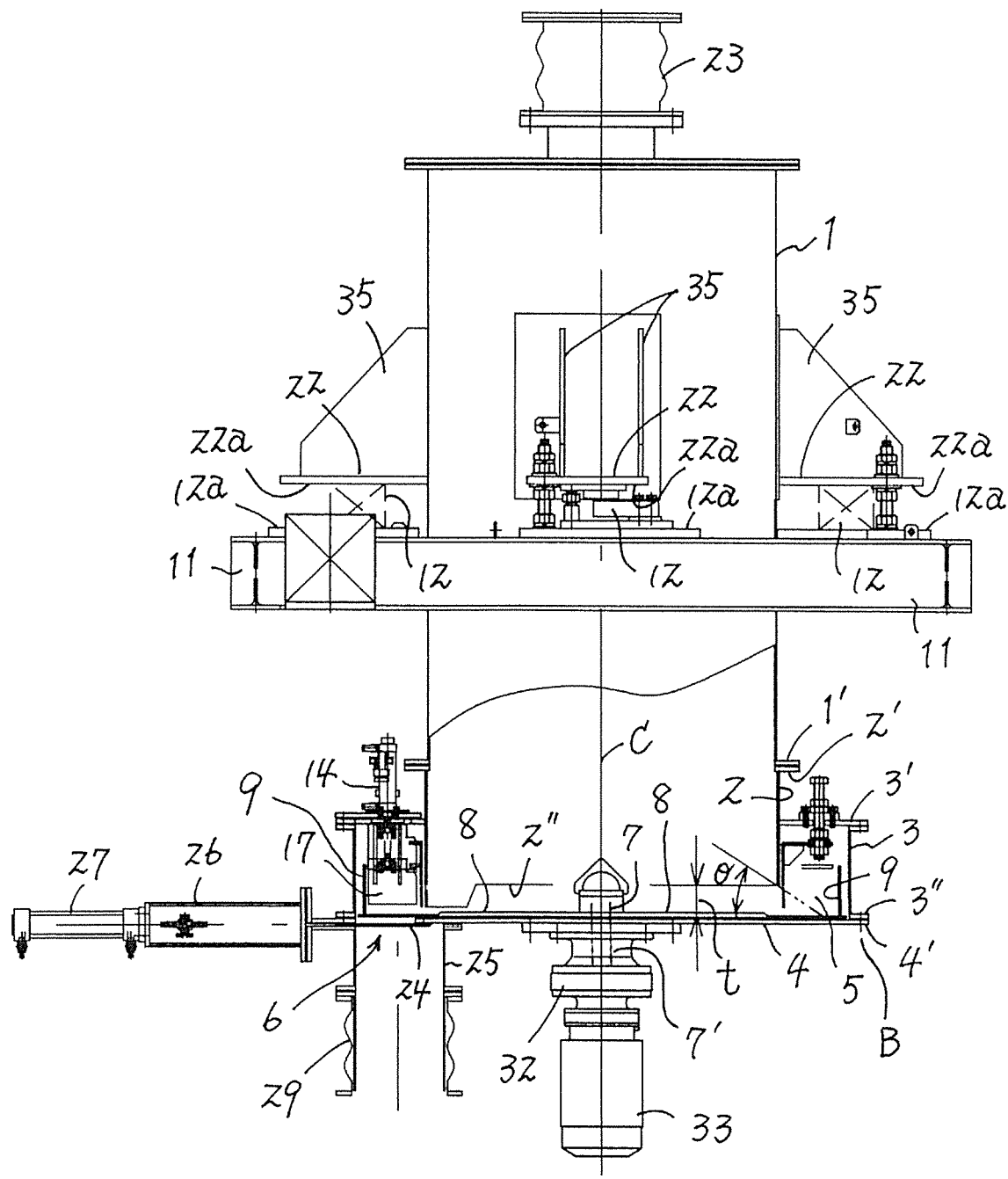
FIG. 1 is a partial sectional side view of a first embodiment of a batch weighing/supply device according to this invention.

As shown in FIG. 1 (a first embodiment), an upper end flange 2' of an inner tube 2 is attached concentrically to a flange 1' of a lower end opening portion of a cylindrical hopper 1 by bolts B (see FIG. 2) such that a central axis C is shared therebetween. An outer tube 3 that shares the central axis C with the inner tube 2 is fixed integrally to an outside surface of the inner tube 2 via an annular disc 3'.

Figure 2:
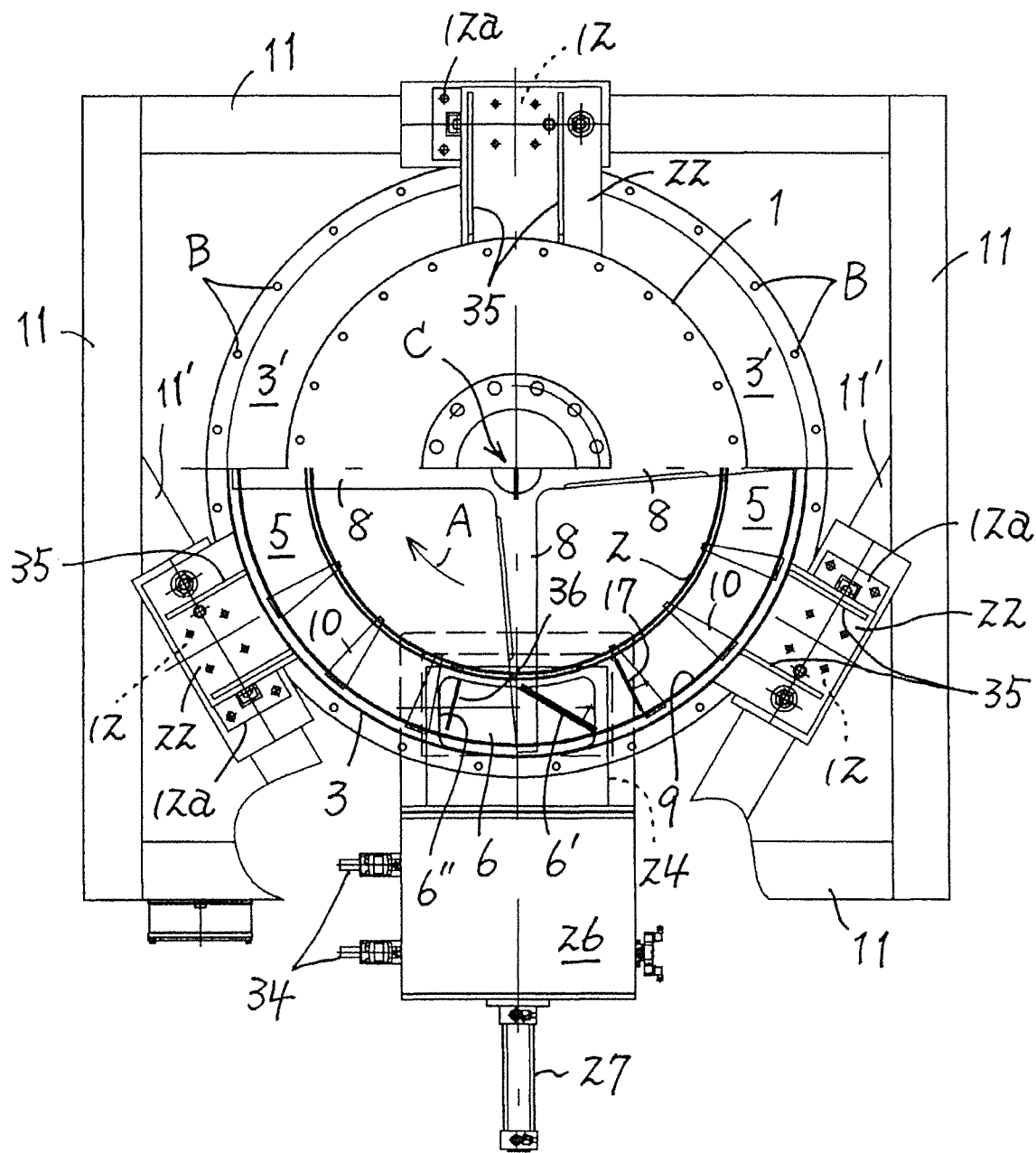
FIG. 2 is a partial sectional plan view of the supply device.

Note that in FIG. 2, the direction of an arrow A corresponds to a rotation direction of a spoke-shaped central rotary blade 8. Accordingly, the opposite direction to the direction of the arrow A relative to a specific reference position in an annular passage 5 between the inner tube 2 and the outer tube 3 will be referred to as an "upstream side", and the arrow A side of the direction of the arrow A relative to the specific reference position will be referred to as a "downstream side".

An outer edge 4' of a circular bottom plate 4 is connected to a lower end flange 3" of the outer tube 3 by bolts B, the annular passage 5 is provided between the inner and outer tubes 2, 3, and a granular material discharge port 6 is provided in the circular bottom plate 4, which forms the lower surface of the passage 5. Note that the annular disc 3' is used to close the upper surface of the annular passage 5.

Figure 4:
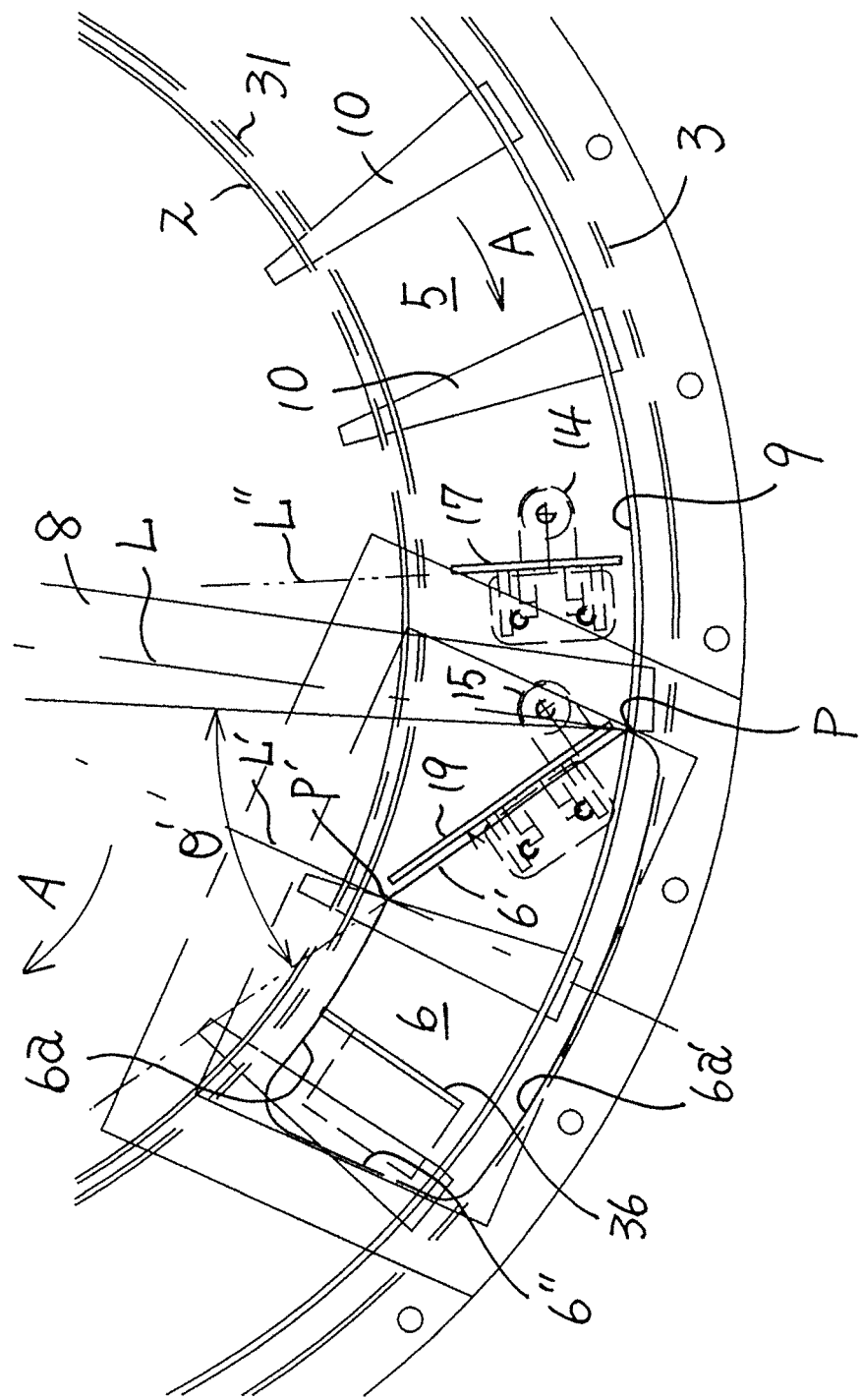
FIG. 4 is a plan view showing the vicinity of a discharge port of the supply device.
Figure 9:
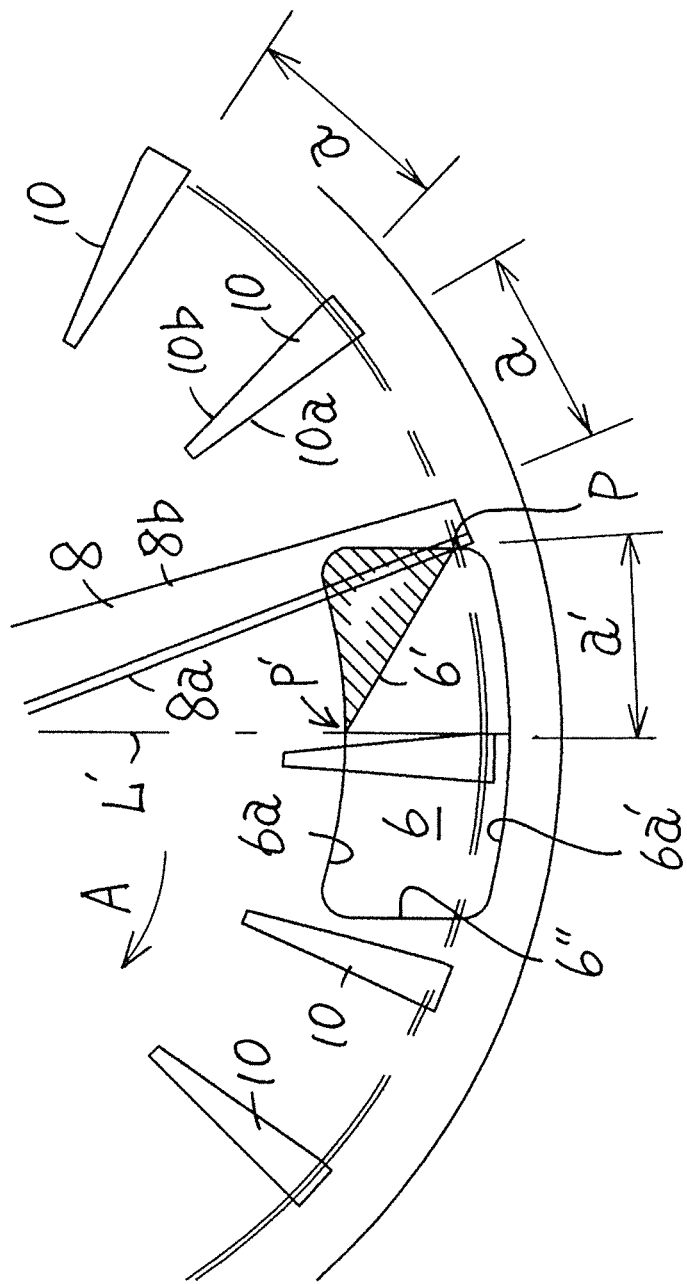
FIG. 9 is a plan view showing the vicinity of the discharge port of the supply device.

As shown in FIGS. 4 and 9, the discharge port 6, in contrast to a conventional, substantially rectangular discharge port, is shaped to have an inclined side edge 6' acquired by inclining an upstream-side side edge of a substantially rectangular discharge port toward the downstream side. More specifically, inner and outer peripheral edges of the discharge port 6 are provided so as to extend in a circumferential direction of a circle centering on the aforesaid center line (central axis) C, and are constituted by an inside arc-shaped side edge 6a extending along the circumference of a circle that centers on the center line C and has a slightly longer radius than the radius of the inner tube 2, and an outside arc-shaped side edge 6a' extending along the circumference of a circle that centers on the center line C and has a substantially identical radius to the outer tube 3. The upstream-side side edge is formed as the inclined side edge 6' using an opening start point P of an outer peripheral-side corner portion as a reference point by inclining an inner peripheral-side corner portion P' toward the downstream side by a predetermined angle θ' (for example, 40 to 60 degrees toward the downstream side about the opening start point P; 40 degrees in the embodiment shown in FIG. 4) relative to a radius line L that passes through the opening start point P and the center line C. The downstream-side side edge is formed as a side edge 6" which is parallel to a radius line L' that splits the outside arc-shaped side edge 6a' into left and right parts and passes through the center line C.

A lower end 2" (see FIG. 1) of the inner tube 2 is provided close to the circular bottom plate 4 so that a granular material payout gap (a discharge gap) t is provided between the lower end 2" of the inner tube 2 and the upper surface of the circular bottom plate 4. Further, an upper end portion 7 of an upright rotary shaft 7' that also shares the center line C projects from the circular bottom plate 4, and four spoke-shaped central rotary blades 8 are provided on the upper end portion 7 so as to extend over the bottom plate 4 at an angle difference of 90 degrees from each other (see FIG. 2).

Tip end portions of the spoke-shaped central rotary blades 8 respectively extend through the granular material payout gap t to positions close to the outer tube 3 in the passage 5, and a rotating wheel 9 is connected to the tip end portions of the spoke-shaped central rotary blades 8. The rotating wheel 9 is configured to be capable of rotating about the center line C together with the spoke-shaped central rotary blades 8.

A plurality of inward blades 10 extending over the circular bottom plate 4 are provided on the inside of the rotating wheel 9 so as to be oriented inward. Three inward blades 10 are provided between adjacent spoke-shaped central rotary blades 8, 8 (for a total of 12 inward blades 10; see FIG. 2), and tip end portions thereof cross the annular passage 5 so as to intrude slightly into the inner tube 2. Extremely narrow gaps are provided between the upper surface of the circular bottom plate 4 and the respective bottom surfaces of the spoke-shaped central rotary blades 8 and inward blades 10 so that the spoke-shaped central rotary blades 8 and the inward blades 10 can rotate without contacting the upper surface of the circular bottom plate 4.

A drive motor 33 constituted by an inverter motor is provided on the upright rotary shaft 7' via a reduction gear 32, and the spoke-shaped central rotary blades 8 and inward blades 10 are driven to rotate in the direction of the arrow A by the drive motor 33.

Figure 3:
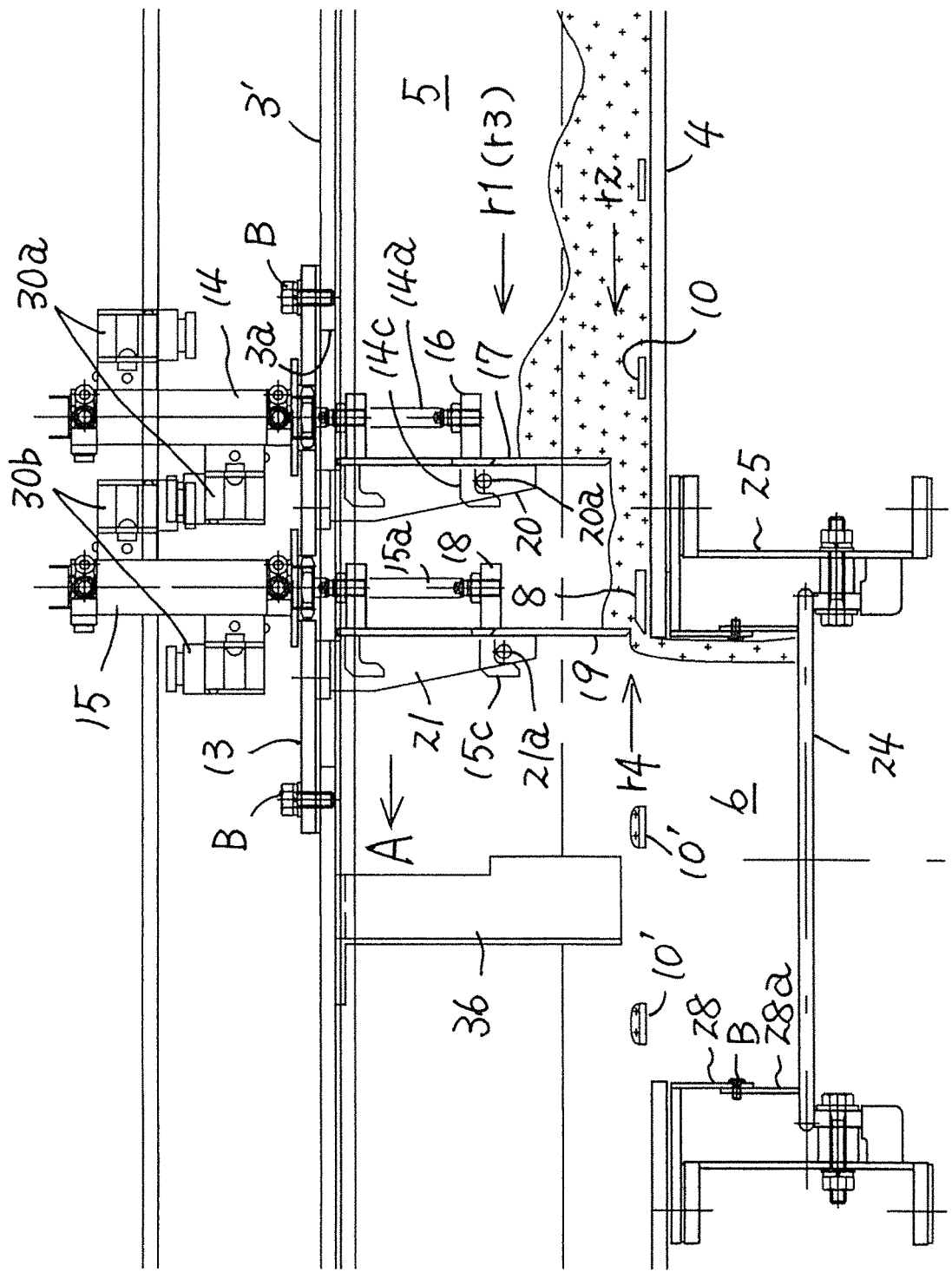
FIG. 3 is a sectional view showing the vicinity of a height adjustable scraper of the supply device.
Figure 13:
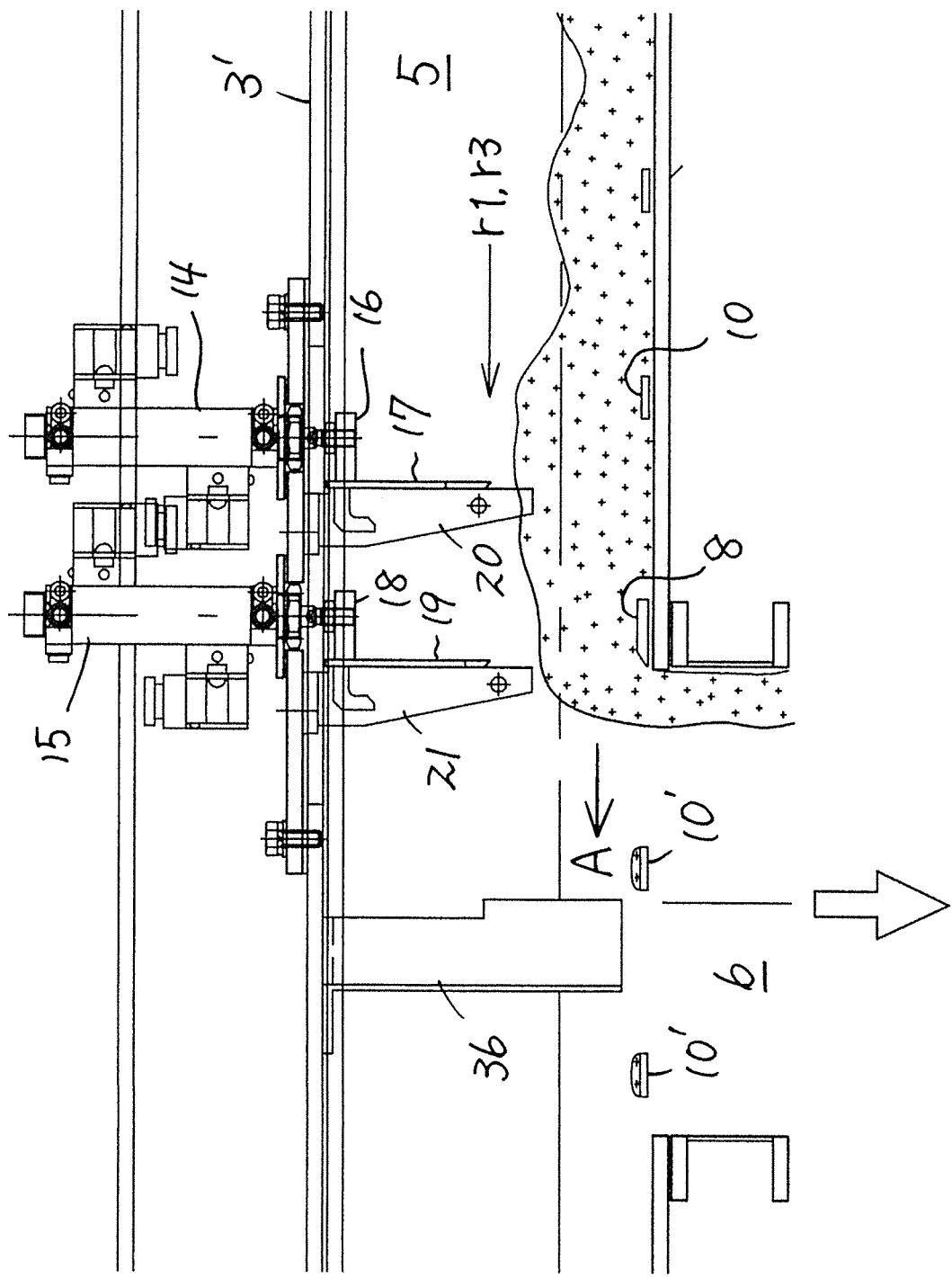
FIG. 13 is a lateral sectional view showing the annular passage in the vicinity of the scrapers during a normal rotation operation of the supply device.

Hence, granular material supplied into the hopper 1 flows out through the payout gap t around the entire circumference of the lower end 2" of the inner tube 2 so as to be paid out into the annular passage 5 at an angle of repose θ (see the dot-dot-dash line in FIG. 1), and by rotating the spoke-shaped central rotary blades 8 in the direction of the arrow A (see FIG. 2) in this state, the granular material that flows out into the annular passage 5 is conveyed through the annular passage 5 in the direction of the arrow A by the rotation of the central rotary blades 8 and inward blades 10 in the direction of the arrow A, whereupon the granular material drops down, i.e. is supplied, through the granular material discharge port 6 (see FIGS. 3 and 13).

Note that the entire batch weighing/supply device, including the hopper 1, as shown in FIGS. 1 and 2, is constructed by fixing a load cell cradle 11 to a machine frame (not shown) erected fixedly on the ground and placing the batch weighing/supply device on the load cell cradle 11 via load cells 12, 12, 12, and by measuring the weight of the entire supply device using the load cells 12, 12, 12, the weight of the raw material discharged and supplied through the discharge port 6 can be recognized. The load cells 12 and so on will be described below.

As described above, a conventional discharge port is formed such that the upstream-side and downstream-side side edges are parallel, as shown in FIG. 9. With the discharge port 6 according to this invention, on the other hand, in contrast to a conventional discharge port, the shaded part shown in FIG. 9 is sealed off such that the upstream side is formed from the inclined side edge 6'. According to this configuration, when a spoke-shaped rotary blade 8 or an inward blade 10 rotates in the direction of the arrow A, the blade crosses the inclined side edge 6', and as a result, the granular material can be discharged in smaller quantities than with a conventional device (approximately ⅕ of a conventional instantaneous discharge quantity).

More specifically, when a spoke-shaped central rotary blade 8 or an inward blade 10 passes over the inclined side edge 6' of the discharge port 6 while rotating in the direction of the arrow A, the spoke-shaped central rotary blade 8 or the inward blade 10 intersects the inclined side edge 6' in a state where the inclined side edge 6' is inclined relative to the spoke-shaped central rotary blade 8 or the inward blade 10 from the opening start point P to the inner peripheral-side corner portion P' of the inclined side edge 6', and therefore, from the opening start point P of the upstream-side end portion of the inclined side edge 6' to the inner peripheral-side corner portion P' of the downstream-side end portion thereof, the opening area of the discharge port 6 formed by the intersection between the spoke-shaped central rotary blade 8 or the inward blade 10 and the inclined side edge 6' widens gradually from a small area to a large area. Hence, from the opening start point P to the inner peripheral-side corner portion P', the instantaneous granular material drop-down quantity can be reduced to approximately ⅕ that of a conventional discharge port having an upstream-side side edge that is parallel to the downstream-side side edge 6". As a result, the quantity of granular material that drops down through the discharge port 6 can be greatly reduced. Therefore, in contrast to a conventional device, in which weighing is performed in a state where comparatively large quantities of granular material drop down, weighing can be performed in a state where small quantities of granular material drop down, and as a result, the precision of batch weighing can be improved.

Furthermore, as shown in FIG. 9, when an inner edge interval between the spoke-shaped central rotary blade 8 and the inward blade 10 is set as an inter-blade distance a, a circumferential direction length a' of the inclined side edge 6' (a circumferential direction distance; the distance between the radius line L' that bisects the outside arc-shaped side edge 6a' of the discharge port 6 and the opening start point P of the inclined side edge 6') is configured to be identical (a=a') to the inter-rotary blade distance a, as shown in the figure. Thus, whenever a trailing edge 8b, 10b of a spoke-shaped central rotary blade 8 or an inward blade 10 passes over the inner peripheral-side corner portion P' of the inclined side edge 6', a leading edge 8a, 10a of the next spoke-shaped central rotary blade 8 or inward blade 10 is always positioned at the opening start point P of the inclined side edge 6', and therefore, at the end of the weighing operation, the weighing operation is terminated in a state where a spoke-shaped central rotary blade 8 or an inward blade 10 is positioned within the range of the inclined side edge 6' (within the range of a'). Hence, the weighing operation can be terminated in a state where small quantities of granular material drop down, i.e. are supplied, and as a result, the weighing precision can be improved. In consideration of this point, the relationship between the inter-rotary blade distance a and the circumferential direction distance a' of the inclined side edge 6' may also be a'≥a. Note that in the embodiment described above, a' is set at half the length of the outside arc-shaped side edge 6a' of the discharge port 6, but a' is not limited to half the length of the outside arc-shaped side edge 6a', and may be either shorter or longer than half the length of the side edge 6a'.

Next, configurations relating to scrapers for leveling the upper surface of the granular material in the granular material supply device will be described.

As shown in FIGS. 3 and 4, an opening 3a is drilled in the disc 3' further toward the upstream side than the inclined side edge 6' on the upstream side of the discharge port 6, and a cylinder support substrate 13 is fixed to the annular disc 3' by bolts B so as to close the opening 3a. A primary cylinder 14 is supported in an upright fashion on the plate surface of the cylinder support substrate 13 on the upstream side further away from the inclined side edge 6', and a secondary cylinder 15 is supported in an upright fashion on the upstream side (of the inclined side edge 6') closer to the inclined side edge 6'.

A telescopic rod 14a of the primary cylinder 14 is positioned on the lower side of the annular disc 3' (inside the annular passage 5) through a through hole in the cylinder support substrate 13, and a primary height adjustable scraper 17 serving as a plate for leveling the upper surface of the granular material is vertically fixed to the telescopic rod 14a via a horizontal support member 16.

Figure 5:
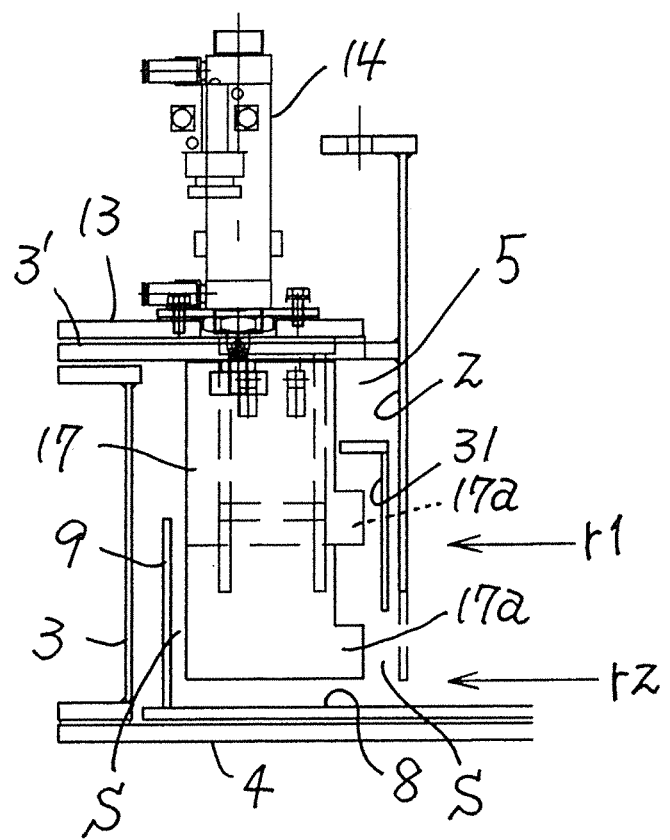
FIG. 5 is a lateral sectional view showing an annular passage in the vicinity of a primary height adjustable scraper of the supply device.

As shown in FIG. 5, the primary height adjustable scraper 17 is a plate-shaped body with a widened portion 17a provided on the inner peripheral side of the lower portion. The primary height adjustable scraper 17 is provided in a direction extending along a radius line L" that passes through the central axis C, and is thereby provided in a direction crossing the annular passage 5 in a radial direction (i.e. an orthogonal direction to the rotation direction A of the spoke-shaped rotary blades 8). Further, as shown in FIG. 5, the primary height adjustable scraper 17 is provided in a height adjustable manner between the rotating wheel 9 in the annular passage 5 and a flow control ring 31 provided on the outside of the inner tube 2.

As shown in FIGS. 3 and 5, when raised, the primary height adjustable scraper 17 is positioned (in a position r1 in FIGS. 3 and 5) so as not to impede the granular material passing through the annular passage 5, and when lowered, the primary height adjustable scraper 17 is positioned (in a position r2 in FIGS. 3 and 5) so as to realize a 70% reduction relative to the full quantity (100%) of granular material passing through the annular passage, or in other words so as to hold back 70% of the granular material so that 30% of the full quantity is allowed to pass. The primary height adjustable scraper 17 is raised and lowered by causing the telescopic rod 14a to expand and contract within the primary cylinder 14. Note that the distance from the opening start point P on the upstream side of the discharge port 6 to the primary height adjustable scraper 17 is set at approximately 100 mm, for example.

A telescopic rod 15a of the secondary cylinder 15 is positioned on the lower side of the annular disc 3' (inside the annular passage 5) through a through hole in the cylinder support substrate 13, and a secondary height adjustable scraper 19 serving as a plate for leveling the upper surface of the granular material is vertically fixed to the telescopic rod 15a via a horizontal support member 18.

Figure 6:
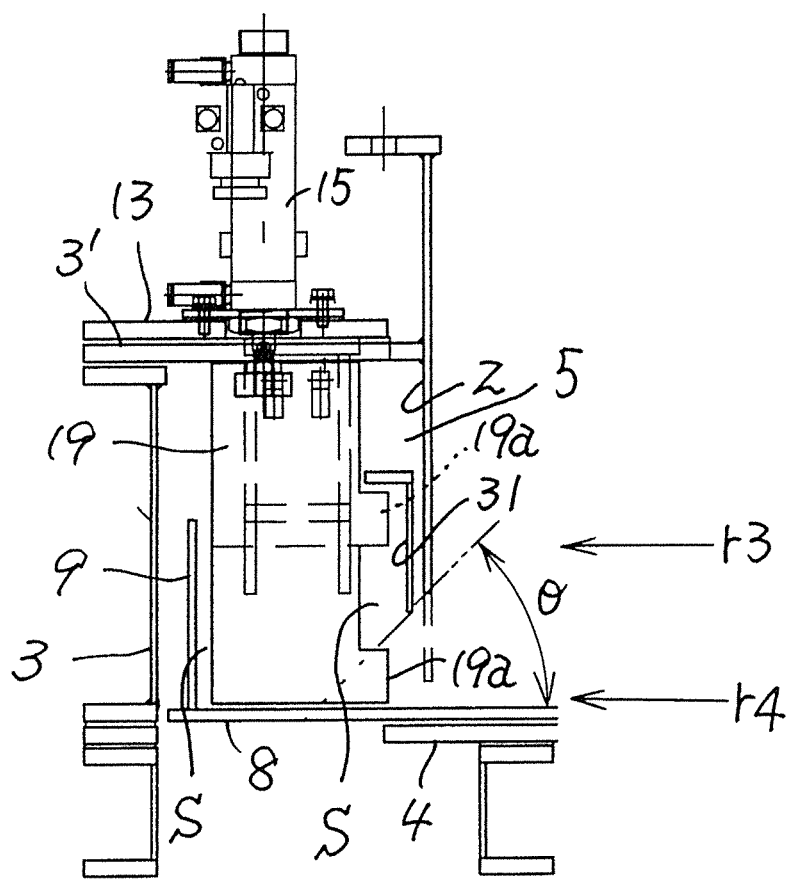
FIG. 6 is a lateral sectional view showing the annular passage in the vicinity of a secondary height adjustable scraper of the supply device.

As shown in FIG. 6, the secondary height adjustable scraper 19 is a plate-shaped body with a widened portion 19a provided on the inner peripheral side of the lower portion. As shown in FIG. 4, the secondary height adjustable scraper 17 is provided along the inclined side edge 6' on the upstream side of the discharge port 6 in an inclined state (similarly to the inclined side edge 6', an inclined state of approximately 40 to 60 degrees (in this embodiment, 40 degrees) in a counterclockwise direction from the radius line L passing through the opening start point P) so as to be parallel and directly adjacent to the inclined side edge 6' (a position approximately 5 mm away the inclined side edge 6' toward the upstream side, for example), and in this inclined state, the secondary height adjustable scraper 19 is provided in a direction crossing the annular passage 5. Further, as shown in FIGS. 4 and 6, the secondary height adjustable scraper 19 is provided in a height adjustable manner between the rotating wheel 9 in the annular passage 5 and the flow control ring 31 provided on the outside of the inner tube 2.

As shown in FIGS. 3 and 6, when raised, the secondary height adjustable scraper 19 is positioned (in a position r3=r1 in FIGS. 3 and 6) so as not to impede the granular material passing through the annular passage 5, and when lowered, the secondary height adjustable scraper 19 is positioned (in a position r4 in FIGS. 3 and 6) so as to hold back a further part of the granular material that has passed under the lowered primary height adjustable scraper 17 and thereby realize an 80% reduction relative to the full quantity (100%) of granular material before passing under the primary height adjustable scraper 17 so that 20% of the full quantity is allowed to pass. The secondary height adjustable scraper 19 is raised and lowered by causing the telescopic rod 15a to expand and contract within the secondary cylinder 15. Further, the secondary height adjustable scraper 19 is provided so as to extend along the inclined side edge 6' of the discharge port 6 directly adjacent to the inclined side edge 6', and therefore, when lowered, the secondary height adjustable scraper 19 can prevent a pulsating flow from forming in the granular raw material flowing out under the secondary height adjustable scraper 19, with the result that the raw material dropping down through the discharge port 6 from the inclined side edge 6' can be reduced evenly. In other words, the secondary height adjustable scraper 19 is provided on the downstream side of the primary height adjustable scraper 17 and directly adjacent to the discharge port 6 on the upstream side thereof so as to be capable of further reducing the quantity of conveyed raw material after the quantity has been reduced by lowering the primary height adjustable scraper 17.

As noted above, the secondary height adjustable scraper 19 is provided parallel to the inclined side edge 6' of the discharge port 6 and is therefore raised and lowered while remaining parallel to the inclined side edge 6' (see FIG. 4). Hence, when a spoke-shaped central rotary blade 8 or an inward blade 10 passes over the inclined side edge 6' in the direction of the arrow A in a state where the secondary height adjustable scraper 19 is lowered, 20% of the full quantity of the granular material drops down from the inclined side edge 6', and likewise during discharge of the granular material in this case, the instantaneous granular material drop-down quantity is reduced to approximately ⅕ that of a conventional discharge port having a side edge that is parallel to the radius line L'. In other words, the spoke-shaped central rotary blades 8 and the inward blades 10 cause the granular material that passes under the secondary height adjustable scraper 19 to drop down gradually through the discharge port 6 while diagonally intersecting the inclined side edge 6', and as a result, the instantaneous granular material drop-down quantity can be reduced to approximately ⅕ that of a conventional device.

Note that guide rails 20, 21 are provided respectively along the primary height adjustable scraper 17 and the secondary height adjustable scraper 19, and stopper pins 20a, 21a are provided respectively on the guide rails 20, 21. Meanwhile, stopper members 14c, 15c are provided respectively on the lower ends of the telescopic rods 14a, 15a. Thus, when the scrapers 17, 19 are lowered, the stopper members 14c, 15c respectively engage with the stopper pins 20a, 21a so that the scrapers 17, 19 can be stopped accurately in predetermined lowered positions.

Further, a pair of limit switches 30a are provided on the upper and lower sides of the primary cylinder 14, and a pair of limit switches 30b are provided on the upper and lower sides of the secondary cylinder 15. By detecting a signal from the upper or lower switch of either the limit switches 30a or the limit switches 30b in a control unit 37 (described below), it is possible to detect whether the primary height adjustable scraper 17 or the secondary height adjustable scraper 19 is in the raised position or the lowered position.

Furthermore, the respective side edges of the primary height adjustable scraper 17 and the secondary height adjustable scraper 19 are positioned a fixed distance S, S (see FIGS. 5 and 6; S=approximately 10 mm, for example) from the respective side faces of the annular passage 5 (in this embodiment, the flow control ring 31 and the rotating wheel 9). In other words, gaps are formed between the respective side edges of the two scrapers 17, 19 and the flow control ring 31 and rotating wheel 9 (between the two scrapers 17, 19 and the respective side faces of the annular passage 5) so that the two scrapers 17, 19 do not interfere with the flow control ring 31 and the rotating wheel 9.

Next, a sliding gate will be described.

Figure 7:
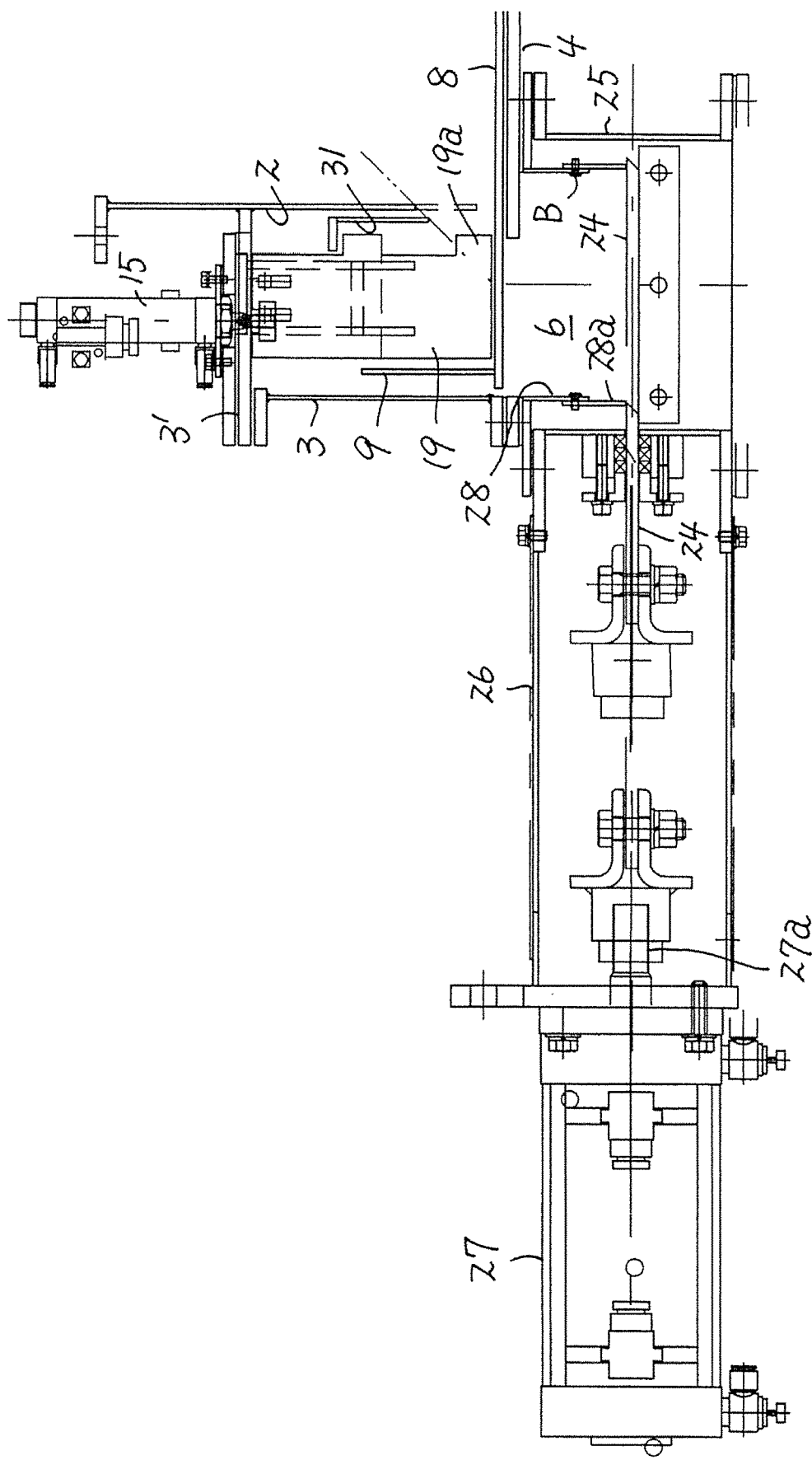
FIG. 7 is a sectional side view showing the vicinity of a sliding gate of the supply device.
Figure 8:
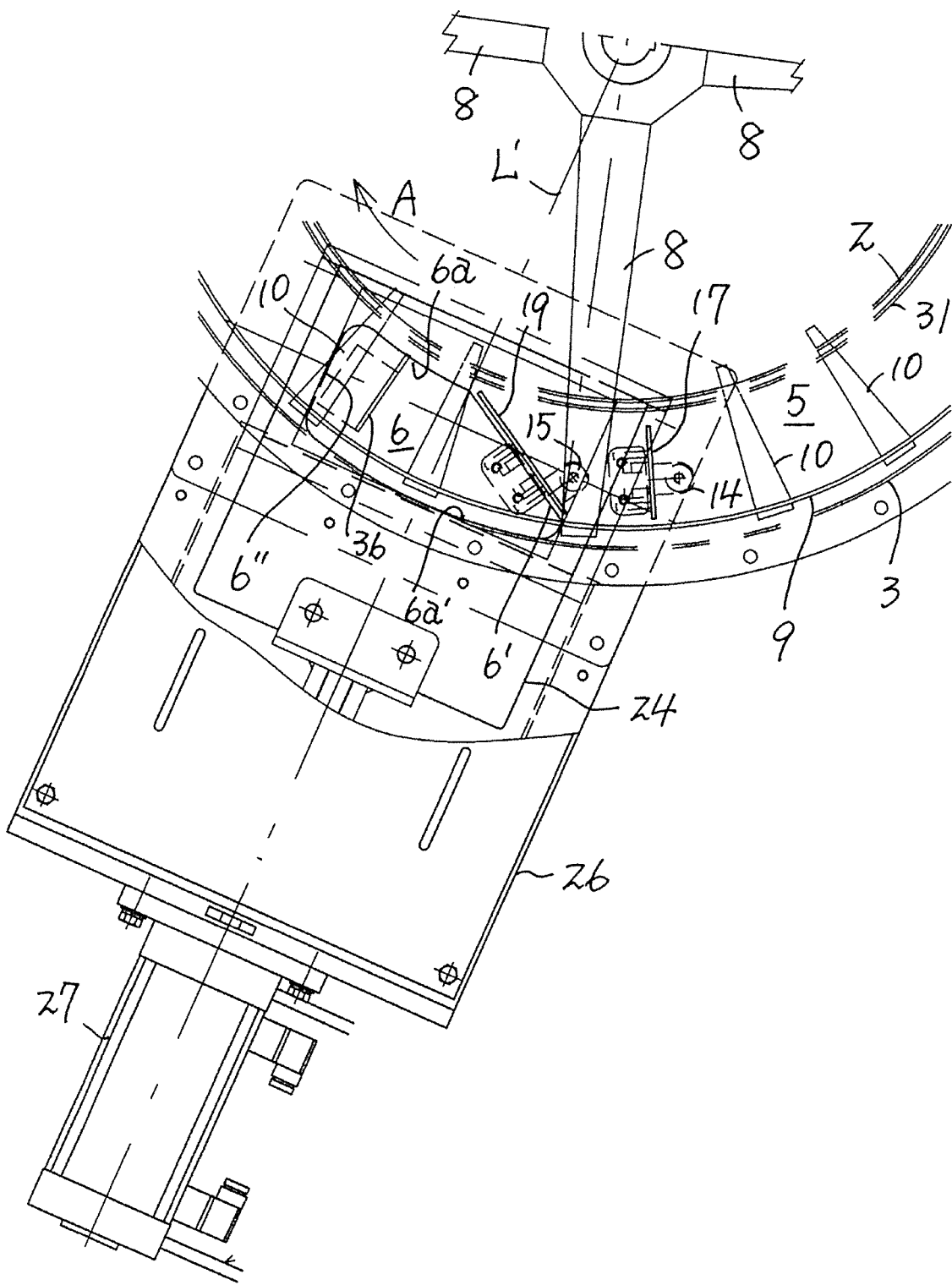
FIG. 8 is a sectional plan view showing the vicinity of the sliding gate of the supply device.

As shown in FIGS. 7 and 8, a tubular chute 25 is fixed to the lower side of the discharge port 6 (the lower surface of the circular bottom plate 4), and a sliding gate attachment machine frame 26 is fixed to the outside of the chute 25 in an outer radial direction along the radius line L'. A pneumatic cylinder 27 is fixed horizontally to an end portion of the attachment machine frame 26, and a telescopic rod 27a of the cylinder 27 is configured to be capable of expanding and contracting in a horizontal direction inside the machine frame 26. A plate-shaped sliding gate 24 is fixed horizontally to a tip end portion of the telescopic rod 27a, and the sliding gate 24 is configured to be capable of closing the discharge port 6 when the telescopic rod 27a expands.

Note that 28 denotes a chute adjustment plate, which is configured such that the position of a lower end of a variable plate 28a provided on the lower side thereof can be adjusted in a vertical direction so as to be positioned on the upper surface of the sliding gate 24 when the sliding gate 24 is closed, and in this position, the variable plate 28a can be fixed by a bolt B. Normally, the telescopic rod 27a of the cylinder 27 is contracted so that the discharge port 6 is open, but by extending the telescopic rod 27a so as to close the chute 25 (the raw material drop-down path) when weighing is finally complete, predetermined batch weighing can be performed.

In FIG. 2, 34 denotes a pair of limit switches configured such that the control unit 37 can detect whether the sliding gate 24 is closed or open on the basis of the state of the limit switches 34.

Returning to FIG. 1, horizontal plates 22, 22, 22 are fixed to the outer periphery of the cylindrical hopper 1 at identical heights so as to project in the radial direction at 120-degree intervals in the circumferential direction (see FIG. 2), and carried portions 22a, 22a, 22a on the lower surfaces of the respective horizontal plates 22, 22, 22 are carried on the load cells 12, 12, 12 fixed to the rectangular load cell cradle 11, which is fixed to the ground G via a machine frame (not shown). Hence, the three load cells 12, 12, 12 are similarly provided at 120-degree intervals in the circumferential direction of the hopper 1. Note that two of the three load cells 12, 12, 12 are provided on connecting rods 11', 11' provided on the inside of the rectangular load cell cradle 11, and the load cells 12, 12, 12 are respectively disposed on load cell bases 12a, 12a, 12a. Note that 35 denotes a reinforcing plate provided between the peripheral wall of the hopper 1 and each horizontal plate 22.

Hence, the weight of all of the constituent members described above, including the hopper 1 and the inner and outer tubes 2, 3 connected to the hopper 1, and the weight of the granular material supplied into the hopper 1 act on the load cells 12, 12, 12. In other words, the weight of the entire batch weighing/supply device, including the weight of the raw material introduced into the hopper 1, is weighed. Therefore, by detecting and storing the initial weight measured by the load cells 12, 12, 12 and subtracting the overall weight of the batch weighing/supply device from this initial weight during a weighing operation, the weight of the raw material discharged through the discharge port 6 can be calculated (this method will be referred to hereafter as "subtraction batch weighing").

Note that in the case of subtraction batch weighing, the sliding gate 24 is preferably provided in a position as close as possible to the circular bottom plate 4 in order to reduce the quantity of granular raw material that drops down after the operation is stopped. Accordingly, as shown in FIG. 3, the sliding gate 24 may be provided in a position slightly below the circular bottom plate 4. Alternatively, as shown in FIG. 1, the sliding gate 24 may be provided directly beneath the circular bottom plate 4. In FIGS. 3 and 4, 36 denotes a fixed scraper provided in the discharge port 6 on the downstream side of the inner peripheral-side corner portion P', an upper end portion of the fixed scraper 36 being fixed to the annular disc 3'. A lower end of the fixed scraper 36 is provided in a position close to the upper surface of the spoke-shaped central rotary blade 8 or the inward blade 10 (an inward blade 10' in FIG. 3, for example) after the spoke-shaped central rotary blade 8 or the inward blade 10 has passed over the inner peripheral-side corner portion P' (see FIG. 3) in order to scrape off the upper limit of the granular material stacked on the rotary blade 8 or the inward blade 10 so that the excess granular material drops down through the discharge port 6.

Figure 10:
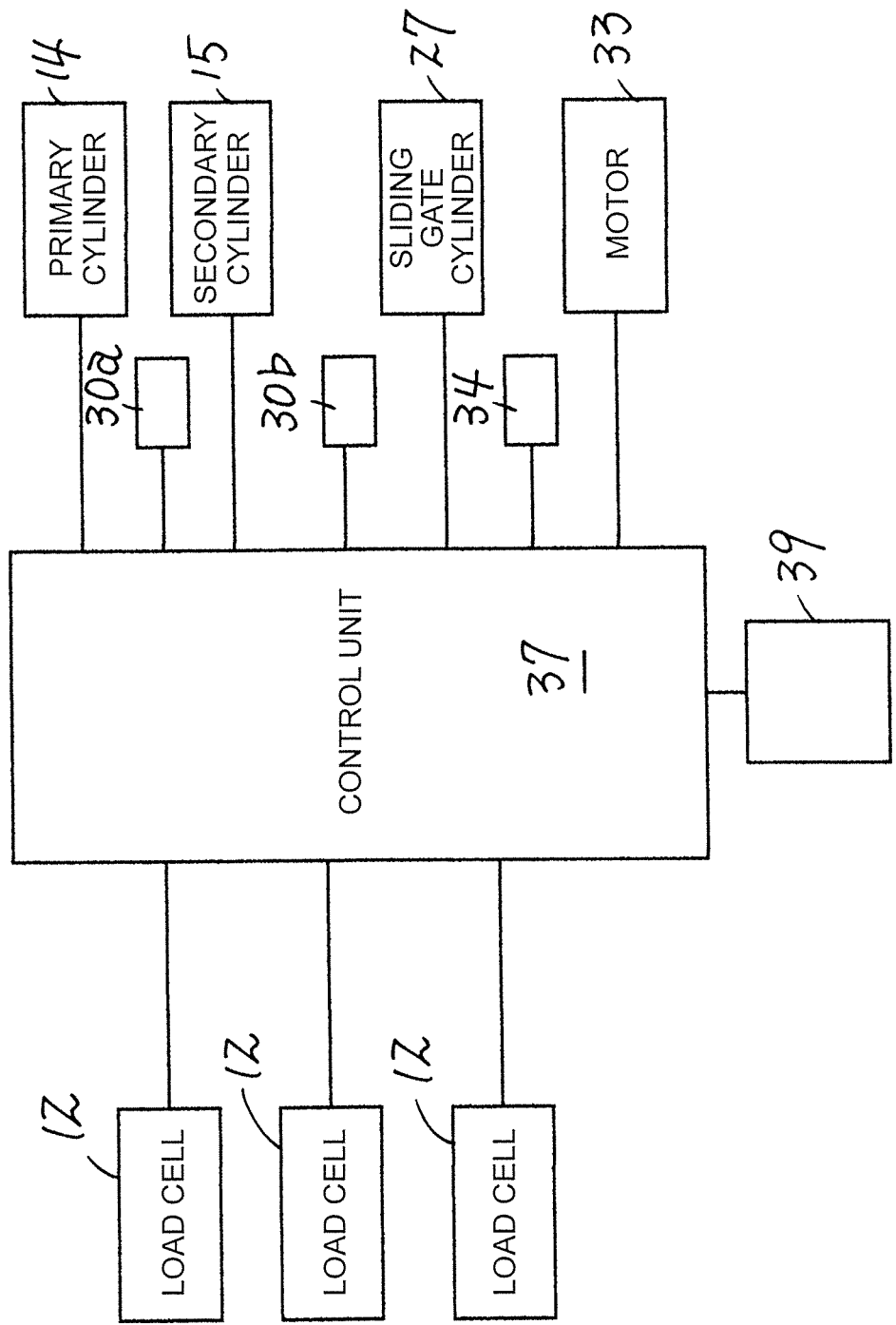
FIG. 10 is a block diagram showing an electrical configuration of the supply device.

Next, an electrical configuration of the granular material supply device according to this invention will be described on the basis of FIG. 10.

In the figure, 37 denotes the control unit, to which are connected the load cells 12, 12, 12, the primary and secondary cylinders 14, 15, the limit switches 30a, 30b thereof, the cylinder 27 for driving the sliding gate, the limit switches 34 thereof, the drive motor 33 for driving the central rotary blades, and an operating panel 39 used to perform various settings. The control unit 37 is a programmable controller storing a program illustrated by operating procedures shown in FIG. 12, and in accordance with this program, an inbuilt microcomputer controls the primary and secondary cylinders 14, 15, the cylinder 27, and the drive motor 33 on the basis of weighing signals from the respective load cells 12.

Figure 11:
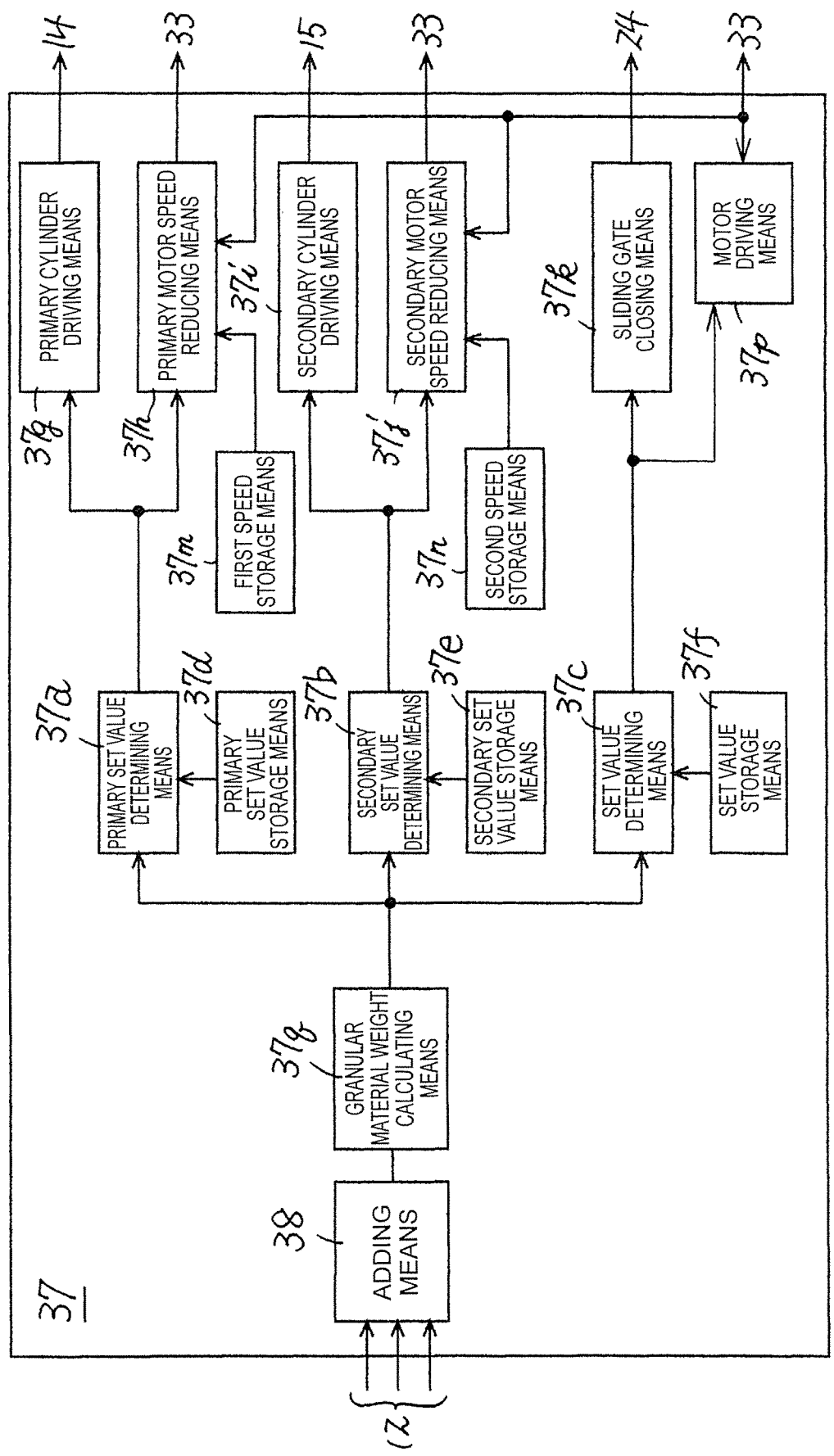
FIG. 11 is a functional block diagram of a control unit of the supply device.

The control unit 37 can ascertain the overall weight (the initial overall weight) of the batch weighing/supply device, including the granular material serving as the raw material, at all times by recognizing the sum of the values of the three load cells 12, 12, 12 from a signal output by adding means 38 (FIG. 11). Then, by subtracting a measured weight transmitted from the adding means 38 from the initial overall weight at the start of the weighing operation using granular material weight calculating means 37q, the control unit 37 can recognize the weight of the granular material discharged through the discharge port 6. Further, the drive motor 33 (an induction motor, for example) performs variable voltage, variable frequency control using an inverter, and motor driving means 37p of the control unit 37 variably controls the rotation speed of the drive motor 33 by varying the frequency.

FIG. 11 is a functional block diagram illustrating functions of the control unit 37, and these functions will be described below together with a description of an operation.

This invention is configured as described above, and an operation thereof will be described below. Note that in this embodiment, the raw material to be weighed is a granular raw material, "10 kg" is set as the set weight of a single batch weighing operation, "9.44 kg" is set as the weighed value (a primary set value) at a timing for lowering the primary height adjustable scraper 17 and implementing a primary speed reduction on the drive motor 33, and "9.92 kg" is set as the weighed value (a secondary set value) at a timing for lowering the secondary height adjustable scraper 19 and implementing a secondary speed reduction on the drive motor 33. First, an operator inputs the respective weighed values described above from the operating panel 39. Accordingly, the control unit 37 (see FIG. 11) stores "10 kg", "9.44 kg", and "9.92 kg", respectively, in set value storage means 37f, primary set value storage means 37d, and secondary set value storage means 37e provided in the interior thereof.

Further, a frequency proportional to the rotation speed of the drive motor 33 during a normal weighing operation is set at 60 Hz (a normal rotation speed), a frequency proportional to the rotation speed during a primary reduction operation is set at 20 Hz (a first speed), and a frequency proportional to the rotation speed during a secondary reduction operation is set at 6 Hz (a second speed), whereupon the first speed (frequency) is stored in first speed storage means 37m and the second speed (frequency) is stored in second speed storage means 37n. Note that the normal rotation speed, first speed, and second speed are not limited to these speeds and may be determined as desired in accordance with the properties of the raw material and so on.

Furthermore, it is assumed that the interior of the hopper 1 is in a state where the granular raw material has been introduced, and the introduced granular material extends from the circular bottom plate 4 to the vicinity of the upper portion of the hopper 1 and has been paid out to the annular passage 5 side at the angle of repose θ from the entire circumference or substantially the entire circumference of the lower end 2" of the inner tube 2.

Moreover, it is assumed that before the start of weighing, the primary height adjustable scraper 17 and the secondary height adjustable scraper 19 are both in the raised positions (the positions r1 and r3) (see FIG. 13), the sliding gate 24 is open, and a granular material storage container (not shown), for example, has been set under an extension chute 29 below the discharge port 6.

Note that in the following description, an operation performed before the primary height adjustable scraper 17 is lowered will be referred to as a "normal operation" or a "normal weighing operation", an operation performed from the point at which the primary height adjustable scraper 17 is lowered to a point before the secondary height adjustable scraper 19 is lowered will be referred to as a "primary reduction operation", and an operation performed from the point at which the secondary height adjustable scraper 19 is lowered to the point at which the set value is weighed and the drive motor 33 is finally stopped will be referred to as a "secondary reduction operation".

Figure 12:
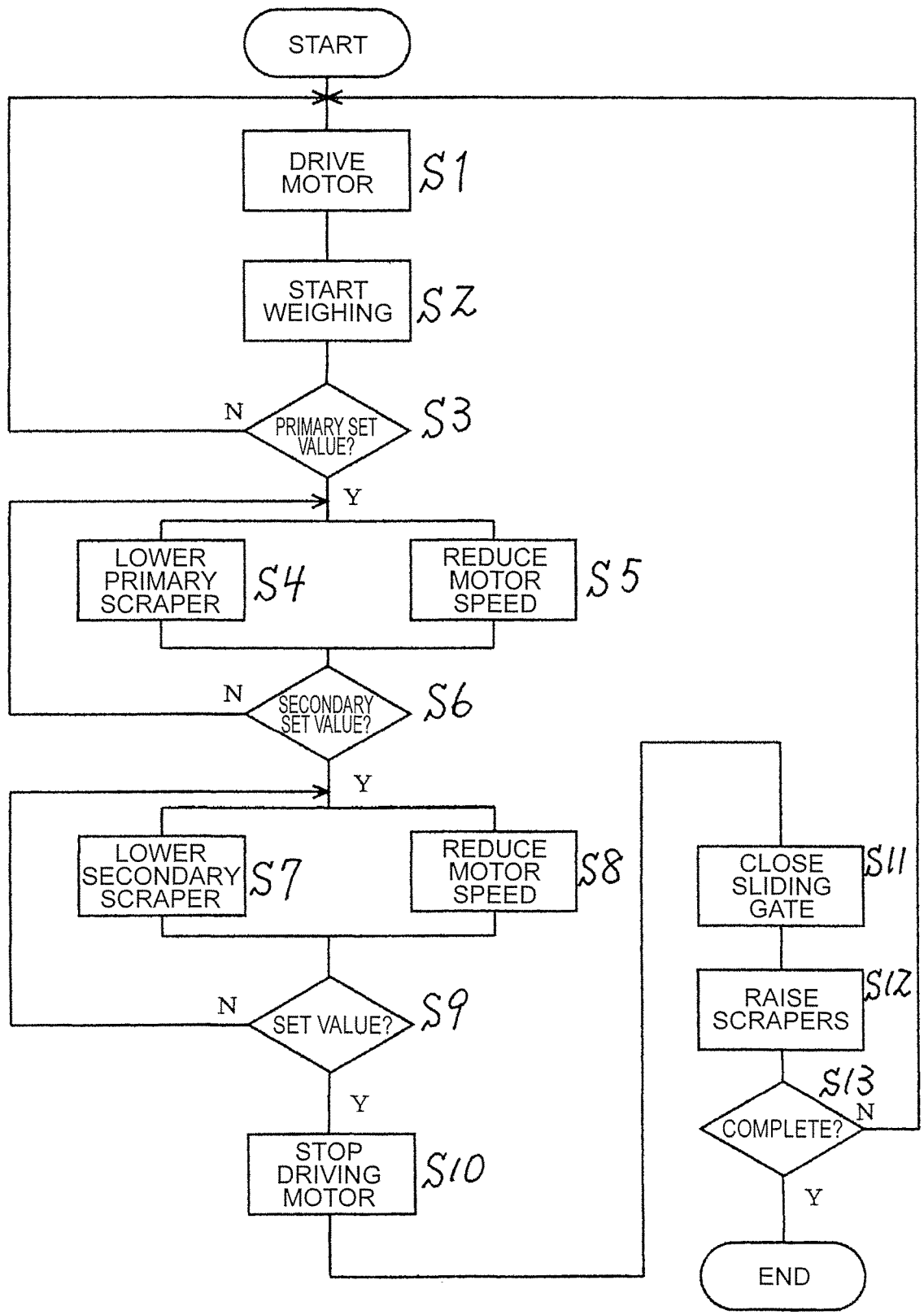
FIG. 12 is a flowchart showing operating procedures performed by the control unit of the supply device.

In this state, the control unit 37 (the motor driving means 37p) rotates the drive motor 33 at the normal rotation speed (60 Hz, for example) (see S1 in FIG. 12; the normal operation). Accordingly, the spoke-shaped central rotary blades 8 and the inward blades 10 rotate in the direction of the arrow A at a rotation speed (1.4 rpm, for example) corresponding to 60 Hz. The granular material paid out into the annular passage 5 is conveyed through the annular passage 5 in the direction of the arrow A by the spoke-shaped central rotary blades 8 and the inward blades 10 to the discharge port 6 and discharged successively downward through the discharge port 6. The granular material discharged through the discharge port 6 drops down through the chute 25 and the extension chute 29 and drops into, i.e. is supplied to, the granular material storage container disposed under the extension chute 29. Note that at this point, the primary and secondary height adjustable scrapers 17, 19 are positioned in the raised positions (r1, r3), and therefore the granular material conveyed through the annular passage 5 drops down through the discharge port 6 without being held back at all. Note that at this point, the granular material discharge quantity is approximately 500 g/sec (see FIG. 13).

As the granular material drops down through the discharge port 6 into the granular material storage container, the overall weight thereof decreases in accordance with the discharged quantity, and therefore the control unit 37 (granular material weight calculating means 38$q$) starts the weighing operation by subtracting the reduced overall weight from the initial overall weight on the basis of the signals from the load cells 12, 12, 12 (the adding means 38). Thus, the control unit 37 constantly recognizes the weight of the discharged granular material (see S2 in FIG. 12).

At this time, the spoke-shaped central rotary blades 8 and the inward blades 10 pass over the upstream-side inclined side edge 6', and as the blades pass over the inclined side edge 6', the granular material constantly drops down from the inclined side edge 6' formed in an inclined state. In other words, because of the inclined side edge 6', the granular material gradually drops down from the outer peripheral side to the inner peripheral side of the annular passage 5, and as a result, the instantaneous drop-down quantity of granular material dropping down through the discharge port 6 is approximately ⅓ that achieved with a conventional discharge port. Hence, while the spoke-shaped central rotary blades 8 and the inward blades 10 pass over the inclined side edge 6', the quantity of granular material dropping down through the discharge port 6 is smaller than that of a conventional device. This granular material drop-down operation is repeated every time a rotary blade 8 or an inward blade 10 passes over the discharge port 6 (the inclined side edge 6'). Note that the operation by which the raw material drops down through the discharge port 6 is substantially completed within the time it takes for the spoke-shaped central rotary blades 8 and the inward blades 10 to pass over the upstream-side inclined side edge 6', and thereafter, the spoke-shaped central rotary blades 8 and the inward blades 10 continue to rotate in the direction of the arrow A with the raw material (the granular material) carried thereon (see FIG. 13 and so on).

Hence, immediately after one spoke-shaped central rotary blade 8 or inward blade 10 crosses the inclined side edge 6' of the discharge port 6, the next inward blade 10 or rotary blade 8 crosses the inclined side edge 6'. Therefore, the quantity of granular material dropping down through the discharge port 6 remains small until the rotary blade 8 or inward blade 10 reaches the inner peripheral-side corner portion P' from the opening start point P on the upstream side, and this small-quantity drop-down supply operation is performed repeatedly. Since the operation for dropping the granular material in small quantities is performed in this manner even during the normal operation, the weighing operation can be performed more accurately than with a conventional device.

Note that after the rotary blades 8 and the inward blades 10 pass over the inner peripheral-side corner portion P' of the inclined upper edge 6', normally, as indicated by the inward blade 10' in FIGS. 3, 13, and so on, the granular material is conveyed in the direction of the arrow A while carried on the inward blade 10' or the spoke-shaped central rotary blade 8. At this time, the granular material that is stacked on the inward blade 10 or the spoke-shaped central rotary blade 8 and held back by the fixed scraper 36 drops down, i.e. is supplied, through the discharge port 6 and used in the weighing operation.

Hence, every time a spoke-shaped central rotary blade 8 or an inward blade 10 passes over the discharge port 6, the drop-down quantity is smaller than (approximately ⅕ of) a conventional drop-down quantity, and therefore rapid increases in the drop-down quantity of the granular material, leading to pulsation or the like, do not occur. As a result, batch weighing can be performed more accurately.

The control unit 37 (primary set value determining means 37$a$) then determines whether or not the weight of the granular material has reached the primary set value (in this embodiment, 9.44 kg) stored in the primary set value storage means 37$d$ (see S3 in FIG. 12). When the discharge operation described above has progressed such that the control unit 37 (the primary set value determining means 37$a$) determines that the weight of the granular material has reached the primary set value (9.44 kg), or in other words when 9.44 kg of granular material have been discharged through the discharge port 6, the control unit 37 (primary cylinder driving means 37$g$) drives the primary cylinder 14 in order to lower the primary height adjustable scraper 17 (see S4 in FIG. 12, and FIG. 14).

Simultaneously with the operation for lowering the primary height adjustable scraper 17, the control unit 37 (primary motor speed reducing means 37$h$) reads the first speed from the first speed storage means 37$m$ and causes the primary motor speed reducing means 37$h$ to set the drive frequency of the motor driving means 37$p$ at 20 Hz (⅓ of the initial frequency), for example, in order to reduce the rotation speed of the drive motor 33 (in this embodiment, the rotation speed is reduced to 0.47 rpm, i.e. ⅓ of the initial rotation speed) (see S5 in FIG. 12; the primary reduction operation).

Figure 14:
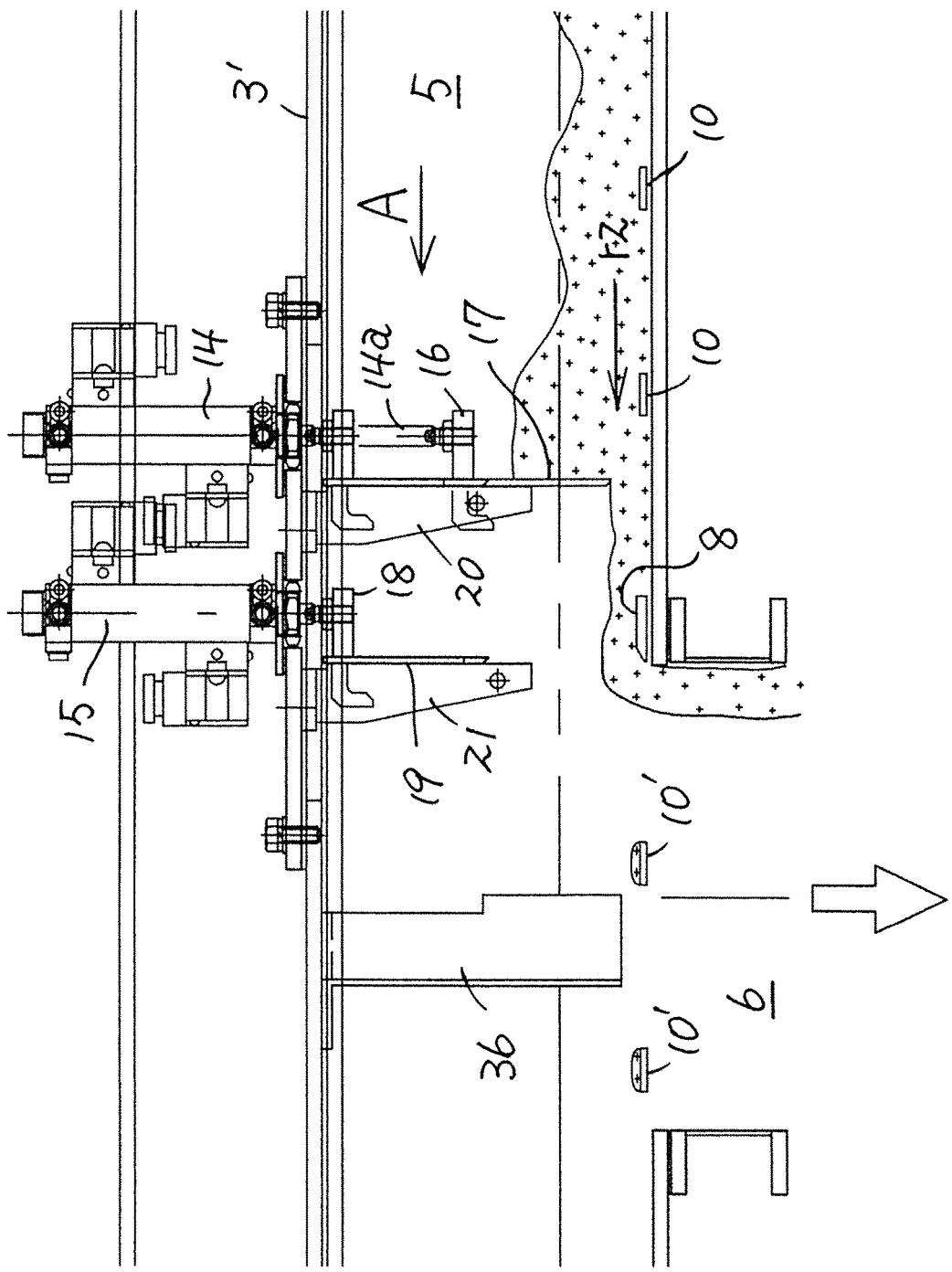
FIG. 14 is a lateral sectional view showing the annular passage in the vicinity of the scrapers during a primary reduction operation of the supply device.

When the primary height adjustable scraper 17 is lowered to the position r2, as shown in FIG. 14, the upper portion (approximately 70% of the full quantity) of the granular material conveyed through the annular passage 5 is held back such that approximately 30% of the full quantity of the granular material is conveyed toward the downstream side through the space between the lower end portion of the primary height adjustable scraper 17 and the upper surface of the circular bottom plate 4.

Since the rotation speed of the drive motor 33 is set at ⅓ (approximately 0.47 rpm) at the same time as the scraper 17 is lowered, the rotation speed of the spoke-shaped central rotary blades 8 and the inward blades 10 also decreases to ⅓. The granular material that passes under the primary height adjustable scraper 17 is conveyed more slowly than during the normal operation in the direction of the arrow A by the spoke-shaped central rotary blades 8 and inward blades 10 rotating at a lower rotation speed. Accordingly, the quantity of granular material that drops down, i.e. is supplied, through the discharge port 6 decreases to 30% of the quantity supplied during the normal operation, and the quantity of granular material that drops down, i.e. is supplied, through the discharge port 6 per unit time also decreases. At this point, the discharge quantity of the granular material discharged through the discharge port 6 decreases to approximately 40 g/sec. At this time, the granular material also flows out through the gaps (the gaps S, S in FIG. 5) on the respective side edges of the lowered primary scraper 17, but the granular material stabilizes over the distance to the discharge port 6, and therefore the detection precision is not adversely affected by this spillage (see FIG. 14).

Similarly, considering that the spoke-shaped central rotary blades 8 and the inward blades 10 pass over and cross the inclined side edge 6' of the discharge port 6, thereby reducing the quantity of granular material to 30% of the quantity thereof prior to arrival at the inclined side edge 6', and that the rotation speed of the spoke-shaped central rotary blades 8 and the inward blades 10 is reduced to ⅓, both the drop-down speed and the discharge quantity of the granular material that drops down, i.e. is supplied, through the discharge port 6 are reduced, and therefore, during the primary reduction operation, the granular material is discharged in small quantities, specifically 40 g per second, after the primary set value (9.44 kg) is reached. As a result, the weighing operation can be performed more accurately than with a conventional device.

Next, the control unit 37 (secondary set value determining means 37b) determines whether or not the weight of the granular material has reached the secondary set value (in this embodiment, 9.92 kg) stored in the secondary set value storage means 37e (see S6 in FIG. 12). When the discharge operation described above has progressed such that the control unit 37 (the secondary set value determining means 37b) determines that the weight of the granular material has reached the secondary set value, or in other words when 9.92 kg of granular material have been discharged through the discharge port 6, the control unit 37 (secondary cylinder driving means 37i) drives the secondary cylinder 15 in order to lower the secondary height adjustable scraper 19 (see S7 in FIG. 12, and FIG. 15).

Simultaneously with the operation for lowering the secondary height adjustable scraper 19, the control unit 37 (secondary motor speed reducing means 37j) reads the second speed from the second speed storage means 37n and sets the drive frequency of the motor driving means 37p at 6 Hz (¹⁄₁₀ of the initial frequency), for example, in order to further reduce the rotation speed of the drive motor 33 (in this embodiment, the rotation speed is reduced to 0.14 rpm, i.e. ¹⁄₁₀ of the initial rotation speed) (see S8 in FIG. 12; the secondary reduction operation).

Figure 15:
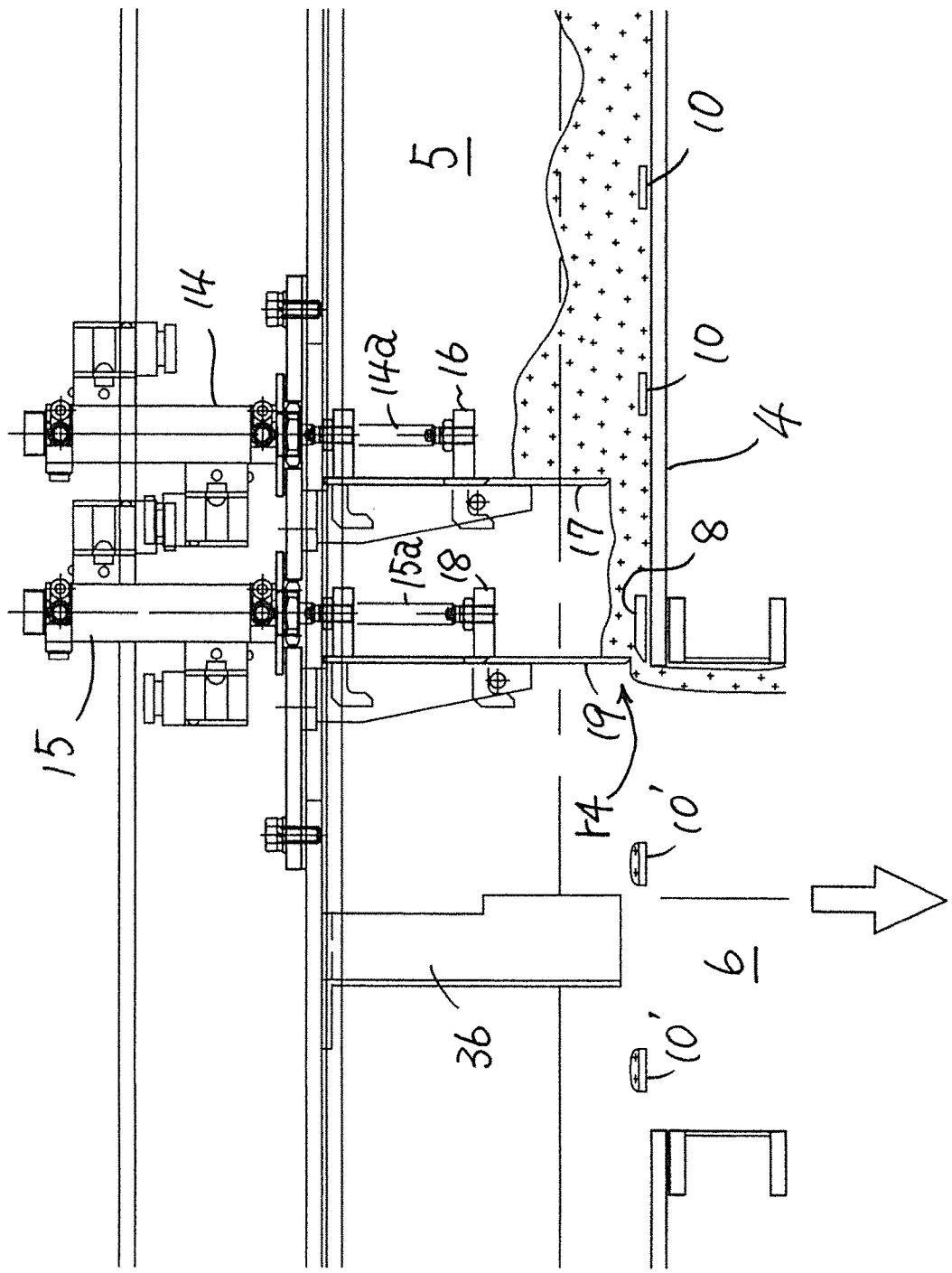
FIG. 15 is a lateral sectional view showing the annular passage in the vicinity of the scrapers during a secondary reduction operation of the supply device.

When the secondary height adjustable scraper 19 is lowered to the position r4, as shown in FIG. 15, the upper portion (approximately 80% of the full quantity) of the granular material conveyed through the annular passage 5 is held back such that approximately 20% of the full quantity of the granular material is conveyed through the space between the lower end portion of the secondary height adjustable scraper 19 and the upper surface of the circular bottom plate 4, whereupon the granular material immediately drops down, i.e. is supplied, from the inclined side edge 6' on the upstream side of the discharge port 6.

Since the rotation speed of the drive motor 33 is set at ¹⁄₁₀ (approximately 0.14 rpm) of the initial rotation speed at the same time as the scraper 19 is lowered, the rotation speed of the central rotary blades 8 and the inward blades 10 decreases to ¹⁄₁₀ of the initial rotation speed, whereby the spoke-shaped central rotary blades 8 and inward blades 10 rotating at the reduced rotation speed pass slowly over the inclined side edge 6' (the granular material discharge quantity being 8 g/sec).

Accordingly, the quantity of granular material that drops down, i.e. is supplied, through the discharge port 6 decreases to 20% of the initial quantity, and likewise with regard to the granular material discharge quantity discharged through the discharge port 6, approximately 8 g of granular material per second drops down, i.e. is supplied, slowly through the discharge port 6 (see FIG. 15). Furthermore, when the secondary height adjustable scraper 19 is lowered, a small quantity of granular material flows out from the respective side edges of the scraper 19 (see FIG. 6) and spills into the discharge port 6. However, the quantity of conveyed granular material has already been reduced to approximately 30% by lowering the primary height adjustable scraper 17, and therefore, in comparison with a conventional case in which the quantity of granular material is reduced in one go by lowering a single height adjustable scraper, the quantity of granular material that spills into the discharge port 6 from the respective side edges (the gaps S, S) of the secondary height adjustable scraper 19 can be reduced to approximately 10% or less (ratio to convention).

After the secondary height adjustable scraper 19 is lowered, the granular material is supplied in extremely small quantities, and therefore the operation for weighing the final set value can be performed extremely accurately. Ultimately, in a state where the two scrapers 17, 19 are both lowered, the instantaneous drop-down quantity of the granular material dropping down through the discharge port 6 can be reduced to approximately 0.4% of the quantity at the stage where both scrapers 17, 19 are raised.

Further, the secondary height adjustable scraper 19 is provided directly in front of the inclined side edge 6' of the discharge port 6 and in an inclined state parallel to the inclined side edge 6' (see FIG. 4), and therefore the granular material reduced to 20% by the scraper 19 immediately drops down, i.e. is supplied, from the inclined side edge 6'. Hence, during the secondary reduction operation, the formation of a pulsating flow, in which the quantity of granular material increases and decreases or the like, can be prevented from forming, and as a result, weighing can be performed extremely accurately.

Next, the control unit 37 (set value determining means 37c) determines whether or not the weight of the granular material has reached the set value (in this embodiment, 10 kg) stored in the set value storage means 37f (see S9 in FIG. 12). When the discharge operation described above has progressed such that the control unit 37 (the set value determining means 37c) determines that the weight of the granular material has reached the set value of 10 kg, or in other words when 10 kg of granular material have been discharged through the discharge port 6, the control unit 37 (the motor driving means 37p) stops the drive motor 33 (see S10 in FIG. 12), and the control unit 37 (sliding gate closing means 37k) drives the sliding gate 24 so as to close the sliding gate 24 (see S11 in FIG. 12, and FIG. 3). By closing the sliding gate 24 simultaneously with the end of weighing in this manner, the quantity of granular material that drops down wastefully can be reduced, and the weighing precision can be improved.

Assuming that 10 kg is reached approximately 10 seconds after the secondary height adjustable scraper 19 is lowered, the secondary reduction operation lasts until the drive motor 33 is stopped and the sliding gate 24 is closed approximately 10 seconds after the secondary height adjustable scraper 19 is lowered (see FIG. 3).

Note that during these 10 seconds, the spoke-shaped central rotary blades 8 and the inward blades 10 pass successively over the inclined side edge 6' on the upstream side of the discharge port 6, but as described above, the circumferential direction length a of the inclined side edge 6' and the inter-rotary blade distance a' are set at identical distances, and therefore, at the point when the drive motor 33 is stopped, either a spoke-shaped central rotary blade 8 or an inward blade 10 is stopped in a position within the range of the inclined side edge 6' on the upstream side of the discharge port 6 (a position between the upstream-side opening start point P and the inner peripheral-side corner portion P') such that the rotary blades 8 and inward blades 10 stop rotating in a state where small-quantity supply of the granular material is maintained. As a result, batch weighing can be performed extremely accurately.

Furthermore, the sliding gate 24, as shown in FIG. 3, is provided in a position close to the circular bottom plate 4, and therefore an accurate weighing operation can be performed during quantity-reduction batch weighing.

Next, the control unit 37 raises the primary height adjustable scraper 17 and the secondary height adjustable scraper 19 (see S12 in FIG. 12), and if the operation is not to be terminated (see S13 in FIG. 12), returns to the first step S1 and performs the next batch weighing operation.

Through the operation described above, precisely 10 kg of granular material can be supplied into the granular material storage container provided under the discharge port 6.

Figure 16:
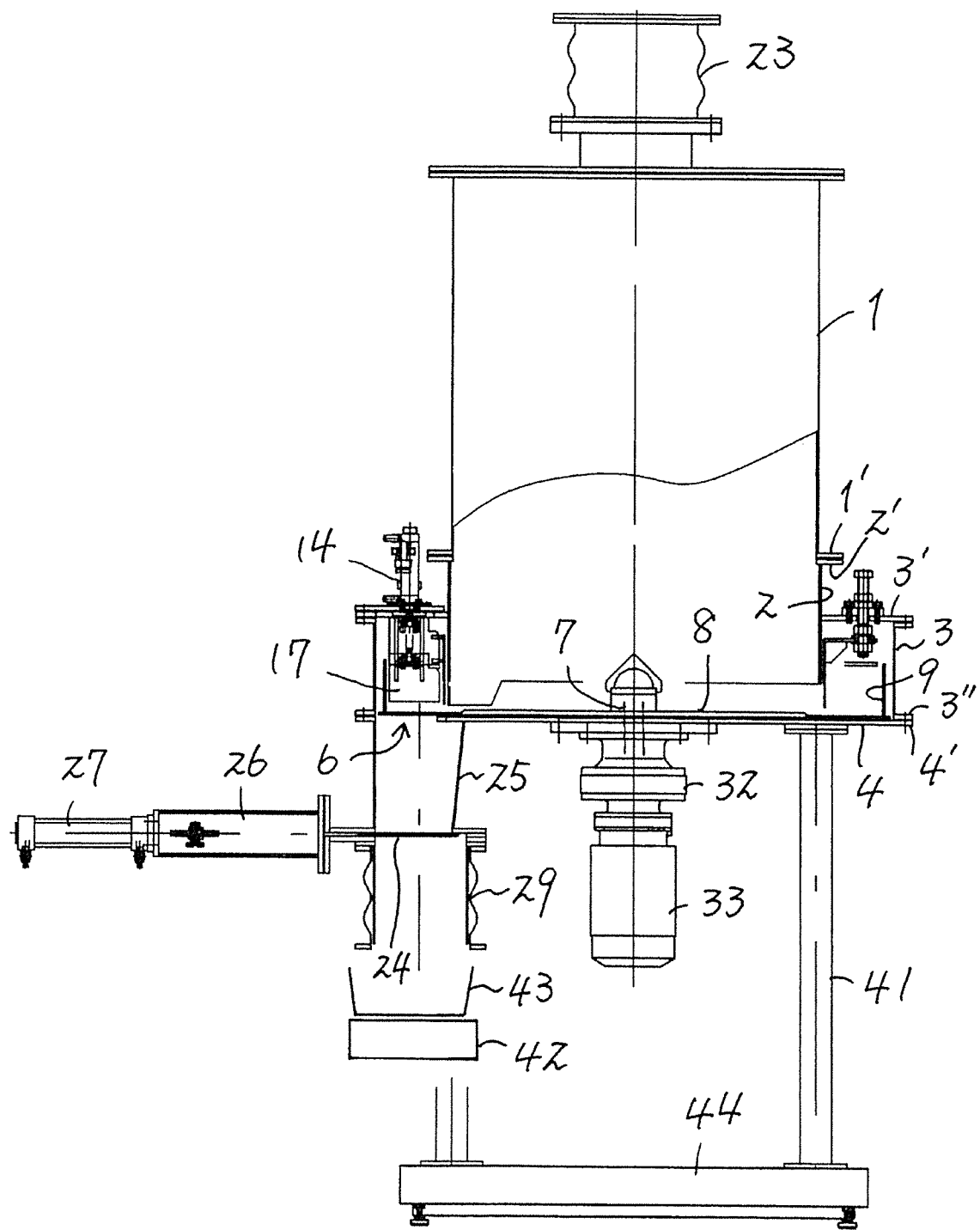
FIG. 16 is a partial sectional side view of a second embodiment of the supply device.
Figure 17:
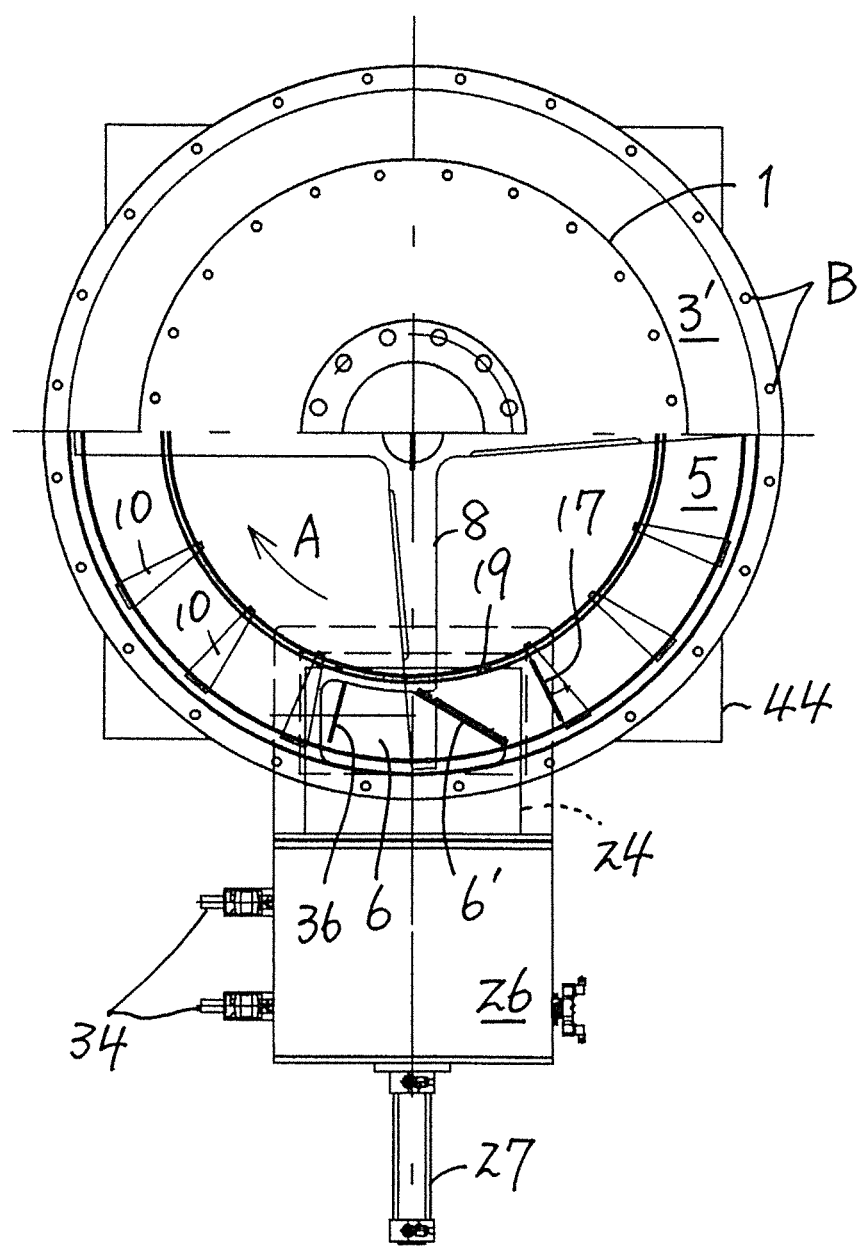
FIG. 17 is a partial sectional plan view of the second embodiment of the supply device.
Figure 18:
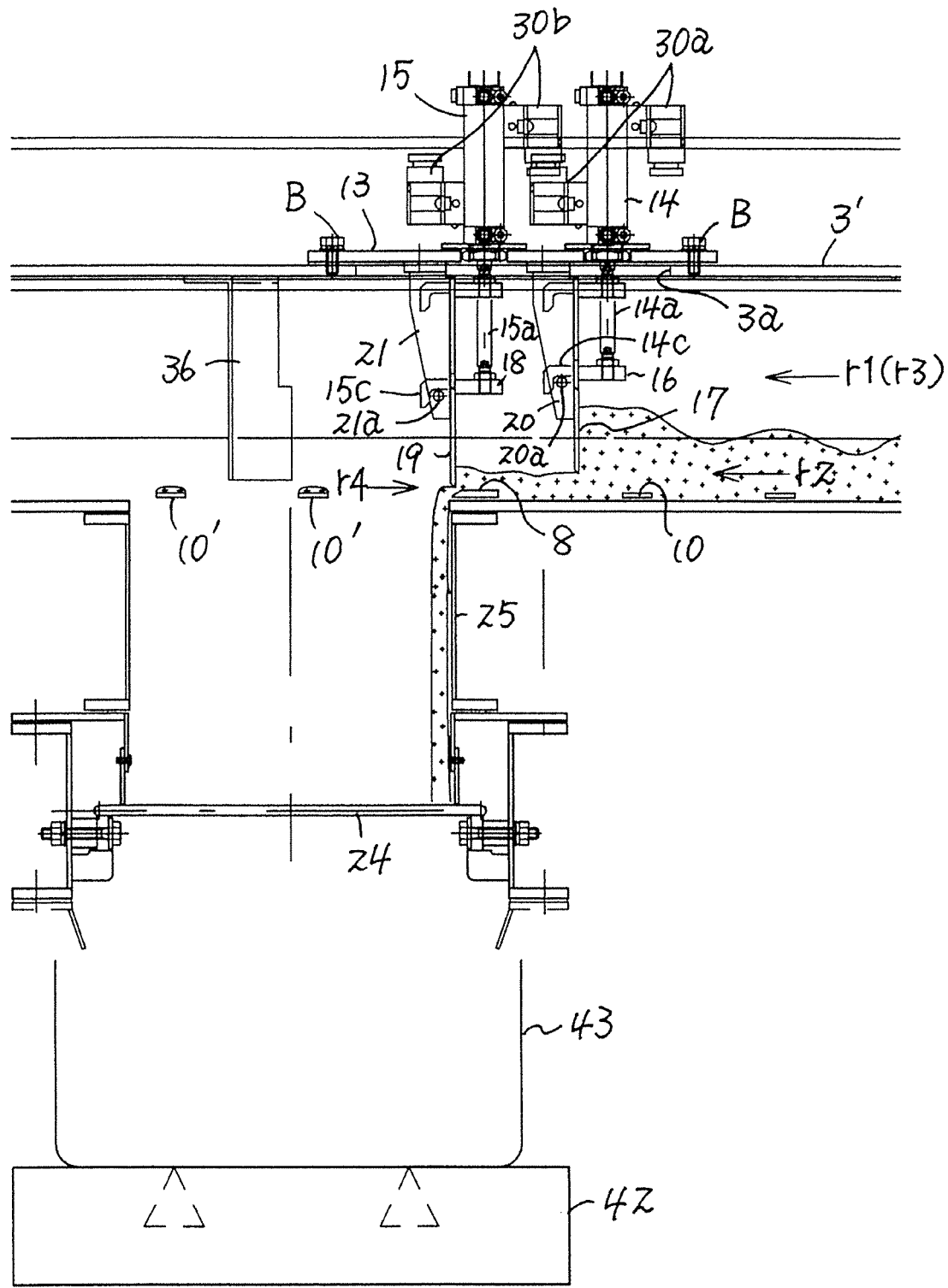
FIG. 18 is a sectional view showing the vicinity of height adjustable scrapers according to the second embodiment of the supply device.

FIGS. 16 to 18 show a second embodiment of the batch weighing/supply device according to this invention. In contrast to the subtraction batch weighing method employed in the first embodiment, the second embodiment employs an after-weighing method. The after-weighing method is a method of providing a weighing machine 42 at a rear stage of the discharge port 6 and weighing the granular material discharged through the discharge port 6 directly using the weighing machine 42. In the second embodiment, only the weighing method differs, and all other configurations are identical to the first embodiment. Accordingly, identical reference symbols have been allocated to constituent parts that are identical to the first embodiment, and description thereof has basically been omitted.

The differences with the first embodiment are that in the first embodiment, the overall weight of the device is measured by the load cells 12, 12, 12 and the weight of the granular material is calculated from the reduction in the overall weight of the device, whereas in the second embodiment, the granular material discharged through the discharge port 6 is weighed directly by the weighing machine 42 (see FIG. 18), which is constituted by an electronic scale disposed under the discharge port 6. In the batch weighing/supply device of the second embodiment, therefore, the configurations of the first embodiment relating to the load cells 12, 12, 12 (the load cell cradle 11, the reinforcing plates 35, and so on surrounding the hopper 1) do not exist, and instead, leg portions 41 are provided on the lower surface of the circular lower plate 4, the batch weighing/supply device is supported on a base 44 by the leg portions 41, the weighing machine 42 is disposed under the extension chute 29 of the discharge port 6, a granular material storage container 43 is placed on the weighing machine 42, and the weight of the granular material or the like serving as the raw material that drops down, i.e. is supplied, through the discharge port 6 is weighed by the weighing machine 42.

Further, with the after-weighing method described above, the chute 25 is formed to be long, and the sliding gate 24 is provided in a position as close as possible to the weighing machine 42. In this batch weighing/supply device, the weighing machine 42 is connected to the control unit 37, a weighed value acquired by the weighing machine 42 is connected to the primary set value determining means 37*a*, the secondary set value determining means 37*b*, and the set value determining means 37*c*, and an accurate batch weighing operation is performed on the basis of the operation procedures shown in FIG. 12 by lowering the primary height adjustable scraper 17 and the secondary height adjustable scraper 19 and reducing the rotation speed of the drive motor 33 in two stages when the respective set values are reached, and closing the sliding gate 24 at the same time as the weighed value reaches the set value. Thus, with the after-weighing method, the granular material can be prevented from dropping down wastefully and weighing can be performed accurately by providing the sliding gate 24 in a position as close as possible to the weighing machine 42.

Hence, likewise when the after-weighing method described above is employed, with the batch weighing/supply device according to this invention, similarly to the first embodiment, the batch weighing operation can be performed with a much higher degree of precision than that achieved with a conventional method.

EXAMPLES

1. Using the granular material supply device according to this invention (the device of the first embodiment), batch weighing was performed on granular material having an extremely small particle size under the following conditions.

|  | Set value | Frequency | Rotation speed | Discharge quantity |
|---|---|---|---|---|
| Normal operation | 10 kg | 60 Hz | 1.4 rpm | 500 g/sec |
| Primary reduction operation | 9.44 kg | 20 Hz | 0.47 rpm | 40 g/sec |
| Secondary reduction operation | 9.92 kg | 6 Hz | 0.14 rpm | 8 g/sec |

The set value was set at 10 kg, and 9.44 kg was weighed approximately 19 seconds after the start of the operation. Accordingly, the primary height adjustable scraper 17 was lowered, and the frequency of the drive motor 33 was set at 20 Hz in order to reduce the rotation speed to ⅓. 9.92 kg was weighed approximately 8 seconds later, and accordingly, the secondary height adjustable scraper 19 was lowered and the frequency of the motor was set at 6 Hz in order to reduce the rotation speed to 1/10 of the initial rotation speed. 10 kg was weighed approximately 10 seconds thereafter, and accordingly, the drive motor 33 was stopped, the sliding gate 24 was closed, the primary and secondary height adjustable scrapers 17, 19 were raised, and weighing was terminated.

2. Effects

When batch weighing of 10 kg was carried out under the above conditions, a weighed value of Q=10.004 kg was acquired a first time, and a weighed value of Q=10.001 kg was acquired a second time. Hence, the weighing precision was greatly improved to 0.04% (first time) and 0.01% (second time). A single weighing operation took 37 seconds. Note that with the batch weighing/supply device according to this embodiment, it was possible to increase the weighing error (the weighing precision) relative to the set value to a stable value of approximately 0.01% to 0.1%.

3. Comparative Example 10 kg of the same raw material were weighed using a conventional device in which the discharge port is a conventional, substantially rectangular discharge port shaped such that the upstream-side side edge and the downstream-side side edge are parallel (i.e. without the inclined side edge 6' of this invention), the primary height adjustable scraper 17 of this invention does not exist, and a single height adjustable scraper is provided directly adjacent to the upstream-side side edge of the discharge port. As a result, 10.03 kg (error 0.3%) were weighed the first time, and 10.05 kg (error 0.5%) were weighed the second time.

Note that the above weighing precision values are for comparison only and are relative rather than absolute. The precision of the batch weighing/supply device according to this invention differs according to the particle size, shape, properties, and so on of the granular material used as the raw material conveyed thereby, and is not therefore limited to the precision values of the above example. Hence, depending on the properties of the raw material, the weighing precision achieved by the batch weighing/supply device according to this invention may be equal to or lower than the precision described above. Nevertheless, with the batch weighing/supply device according to this invention, it is possible to realize higher-precision weighing than the weighing precision achieved using a conventional device.

According to this invention, the quantity of raw material discharged in order to be weighed and the discharge speed thereof can be reduced in two stages so that even with a granular material exhibiting poor fluidity, for example, spillage of the granular material from the respective side edges of the scrapers can be suppressed, with the result that extremely accurate batch weighing can be realized. In other words, a dramatic improvement in the precision of batch weighing can be achieved.

Further, the inclined side edge 6' of the discharge port 6 intersects the rotary blades in an inclined state, and therefore the quantity of raw material dropping down through the discharge port 6 can be reduced (to approximately ⅕ as a ratio to convention, for example). As a result, weighing can be performed even more accurately.

Moreover, a pulsating flow can be prevented from forming in the raw material discharged through the discharge port 6, and therefore the quantity of raw material dropping down through the discharge port from the inclined side edge 6' can be reduced evenly.

Furthermore, the batch weighing operation can be performed with an extremely high degree of precision using both the quantity-reduction batch weighing method and the after-weighing method as the weighing method, i.e. irrespective of the weighing method.

In addition, at the end of the batch weighing operation, a rotary blade 8, 10 is always stopped in the position of the inclined side edge 6' of the discharge port 6, and therefore the batch weighing performed during the batch weighing operation can be stopped in the position of the inclined side edge 6' of the discharge port 6. As a result, an extremely accurate weighing operation can be realized. Note that in FIGS. 1 and 16, 23 denotes a raw material introduction unit.

INDUSTRIAL APPLICABILITY

With the batch weighing/supply device according to this invention, extremely accurate batch weighing can be performed, and therefore the batch weighing/supply device according to this invention can be used widely to accurately weigh granular material of various properties.

REFERENCE SIGNS LIST

2 Inner tube
2" Lower end
3 Outer tube
4 Circular bottom plate
5 Annular passage
6 Discharge port
6' Inclined side edge
8 Spoke-shaped central rotary blade
10 Inward blade
12 Load cell
17 Primary height adjustable scraper
19 Secondary height adjustable scraper
24 Sliding gate
25 Chute
29 Extension chute
37 Control unit
37d Primary set value storage means
37e Secondary set value storage means
37f Set value storage means
42 Weighing machine
t Discharge gap
θ Angle of repose
L Radius line
P Opening start point
P' Inner peripheral-side corner portion

The invention claimed is:

1. A batch weighing/supply device in which an inner tube is provided above a circular bottom plate on a shared central axis and with a predetermined gap therebetween, an outer tube is provided on the circular bottom plate concentrically with the inner tube such that an annular passage is formed between the inner and outer tubes, a raw material in the inner tube is paid out to the annular passage side from a lower end of the inner tube at a predetermined angle of repose, a plurality of rotary blades are provided so as to rotate on the circular bottom plate about the central axis, a discharge port for the raw material conveyed through the annular passage by the rotary blades is provided in the annular passage, and weighing means is provided to weigh the raw material discharged through the discharge port, wherein, in the annular passage, a primary height adjustable scraper that reduces the quantity of conveyed raw material when lowered is provided on an upstream side of the discharge port, and a secondary height adjustable scraper that further reduces the quantity of conveyed raw material, after the quantity has been reduced by lowering the primary height adjustable scraper, is provided on a downstream side of the primary height adjustable scraper and directly adjacent to the discharge port on the upstream side thereof, respective side edges of both the primary and the secondary height adjustable scrapers are provided in positions a fixed distance away from respective side faces of the annular passage, an upstream-side edge portion of the discharge port is formed as an inclined side edge that intersects the rotary blades, the secondary height adjustable scraper being provided to extend along the inclined side edge, control means is provided to reduce the rotation speed of the rotary blades to a first speed, which is lower than a normal rotation speed, when the primary height adjustable scraper is lowered and reduce the rotation speed of the rotary blades to a second speed, which is lower than the first speed, when the secondary height adjustable scraper is lowered, and a sliding gate capable of opening and closing a raw material drop-down path is provided in a chute unit provided under the discharge port.

2. The batch weighing/supply device according to claim 1, wherein, using an upstream-side opening start point of the discharge port as a reference, the inclined side edge of the discharge port is formed by inclining an inner peripheral-side corner portion in a counterclockwise direction toward the downstream side by a predetermined angle relative to a radius line of the circular bottom plate that passes through the opening start point, and the primary height adjustable scraper is provided in an orthogonal direction to a direction in which the raw material passes through the annular passage.

3. The batch weighing/supply device according to claim 2, wherein storage means is provided to store a set value of batch weighing, a primary set value, and a secondary set value,
control means is provided for the primary and secondary height adjustable scrapers, the rotary blades, and the sliding gate, and
the control means is configured to perform a primary reduction operation, in which the primary height adjustable scraper is lowered and the rotation speed of the rotary blades is reduced, when a weighed value reaches the primary set value during a normal weighing operation, to perform a secondary reduction operation, in which the secondary height adjustable scraper is lowered and the rotation speed of the rotary blades is reduced below that of the primary reduction operation, when the weighed value reaches the secondary set value, and to stop the rotary blades from rotating when the weighed value reaches the set value.

4. The batch weighing/supply device according to claim 3, wherein the weighing means includes a load cell for weighing the overall weight of the batch weighing/supply device, and the weight of the raw material discharged through the discharge port is calculated on the basis of the overall weight of the device, acquired from the load cell.

5. The batch weighing/supply device according to claim 2, wherein the weighing means includes a weighing machine disposed under the discharge port, and the weight of the raw material discharged through the discharge port is recognized on the basis of a weighed value acquired from the weighing machine.

6. The batch weighing/supply device according to claim 2, wherein the weighing means includes a load cell for weighing the overall weight of the batch weighing/supply device, and the weight of the raw material discharged through the discharge port is calculated on the basis of the overall weight of the device, acquired from the load cell.

7. The batch weighing/supply device according to claims 1, wherein, when an inter-rotary blade distance between the rotary blades is set as a and a circumferential direction length of the inclined side edge of the discharge port is set as a', a relationship of a'≥a is established.

8. The batch weighing/supply device according to claim 1, wherein storage means is provided to store a set value of batch weighing, a primary set value, and a secondary set value,
control means is provided for the primary and secondary height adjustable scrapers, the rotary blades, and the sliding gate, and
the control means is configured to perform a primary reduction operation, in which the primary height adjustable scraper is lowered and the rotation speed of the rotary blades is reduced, when a weighed value reaches the primary set value during a normal weighing operation, to perform a secondary reduction operation, in which the secondary height adjustable scraper is lowered and the rotation speed of the rotary blades is reduced below that of the primary reduction operation, when the weighed value reaches the secondary set value, and to stop the rotary blades from rotating when the weighed value reaches the set value.

9. The batch weighing/supply device according to claim 8, wherein the weighing means includes a load cell for weighing the overall weight of the batch weighing/supply device, and the weight of the raw material discharged through the discharge port is calculated on the basis of the overall weight of the device, acquired from the load cell.

10. The batch weighing/supply device according claim 8, wherein the weighing means includes a weighing machine disposed under the discharge port, and the weight of the raw material discharged through the discharge port is recognized on the basis of a weighed value acquired from the weighing machine.

11. The batch weighing/supply device according to claim 1, wherein the weighing means includes a load cell for weighing the overall weight of the batch weighing/supply device, and the weight of the raw material discharged through the discharge port is calculated on the basis of the overall weight of the device, acquired from the load cell.

12. The batch weighing/supply device according to claim 11, wherein the sliding gate is provided in a position close to the circular bottom plate within the chute unit.

13. The batch weighing/supply device according to claim 1, wherein the weighing means includes a weighing machine disposed under the discharge port, and the weight of the raw material discharged through the discharge port is recognized on the basis of a weighed value acquired from the weighing machine.

14. The batch weighing/supply device according to claim 13, wherein the sliding gate is provided in a position close to the weighing machine under the chute unit.

15. An operating method for a batch weighing/supply device in which an inner tube is provided above a circular bottom plate on a shared central axis and with a predetermined gap therebetween, an outer tube is provided on the circular bottom plate concentrically with the inner tube such that an annular passage is formed between the inner and outer tubes, a raw material in the inner tube is paid out to the annular passage side from a lower end of the inner tube at a predetermined angle of repose, a plurality of rotary blades are provided so as to rotate on the circular bottom plate about the central axis, a discharge port for the raw material conveyed through the annular passage by the rotary blades is provided in the annular passage, and weighing means is provided to weigh the raw material discharged through the discharge port,
wherein a primary height adjustable scraper provided on an upstream side of the discharge port in order to reduce the quantity of conveyed raw material when lowered, a secondary height adjustable scraper provided on a downstream side of the primary height adjustable scraper and directly adjacent to the discharge port on the upstream side thereof in order to further reduce the quantity of conveyed raw material after the quantity has been reduced by lowering the primary height adjustable scraper, a sliding gate for stopping the raw material from dropping down through the discharge port, control means for drive-controlling the rotary blades, the primary and secondary height adjustable scrapers, and the sliding gate on the basis of a weighed value from the weighing means, and storage means for storing a set value of batch weighing, a primary set value, and a secondary set value are provided in the annular passage,
an upstream-side edge portion of the discharge port is formed as an inclined side edge that intersects the rotary blades, and
the control means executes the steps of:
performing a normal weighing operation for causing the raw material to drop down so as to be supplied through the discharge port, in which the primary height adjustable scraper and the secondary height adjustable scraper are both in raised positions and the raw material is supplied by driving the rotary blades to rotate, until the weighed value reaches the primary set value;

performing a primary reduction operation, in which the quantity of conveyed raw material is reduced by lowering the primary height adjustable scraper and the rotation speed of the rotary blades is reduced, from a point at which the weighed value reaches the primary set value;

performing a secondary reduction operation, in which the quantity of conveyed raw material is further reduced by lowering the secondary height adjustable scraper and the rotation speed of the rotary blades is further reduced, from a point at which the weighed value reaches the secondary set value; and stopping the rotary blades from rotating and stopping the raw material from dropping down through the discharge port by closing the sliding gate from a point at which the weighed value reaches the set value.

\* \* \* \* \*